(12) United States Patent
Kojima

(10) Patent No.: US 10,202,244 B2
(45) Date of Patent: Feb. 12, 2019

(54) WORKPIECE SUPPLYING DEVICE, ROBOT, AND ROBOT SYSTEM

(71) Applicant: Seiko Epson Corporation, Tokyo (JP)

(72) Inventor: Tsuguya Kojima, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/877,457

(22) Filed: Jan. 23, 2018

(65) Prior Publication Data

US 2018/0141760 A1 May 24, 2018

Related U.S. Application Data

(63) Continuation of application No. 15/200,521, filed on Jul. 1, 2016, now Pat. No. 9,908,715.

(30) Foreign Application Priority Data

Jul. 31, 2015 (JP) .................................. 2015-152889
Jul. 31, 2015 (JP) .................................. 2015-152890

(51) Int. Cl.
*B65G 47/24* (2006.01)
*B65G 47/14* (2006.01)

(52) U.S. Cl.
CPC .......... *B65G 47/1421* (2013.01); *B65G 47/24* (2013.01); *B65G 2203/041* (2013.01)

(58) Field of Classification Search
CPC ................ B65G 47/1421; B65G 47/14; B65G 47/1492; B65G 47/24; G05B 2219/39543; G05B 2219/40053; B25J 9/1612; B25J 13/08

USPC ................... 198/391, 395, 401, 409
See application file for complete search history.

(56) References Cited

U.S. PATENT DOCUMENTS

| 3,893,266 | A | | 7/1975 | Anderson et al. |
| 5,517,768 | A | * | 5/1996 | Aviv ....................... B05B 5/025 34/255 |
| 9,908,715 | B2 | * | 3/2018 | Kojima .............. B65G 47/1421 |
| 2002/0096445 | A1 | * | 7/2002 | Austin ................... B65D 19/38 206/386 |
| 2002/0195474 | A1 | | 12/2002 | Tsuyuki et al. |
| 2007/0033785 | A1 | | 2/2007 | Kohring |
| 2007/0229756 | A1 | * | 10/2007 | Mandler ............... B24B 13/005 351/159.74 |
| 2008/0082213 | A1 | | 4/2008 | Ban et al. |
| 2009/0240372 | A1 | | 9/2009 | Bordyn et al. |
| 2011/0288677 | A1 | | 11/2011 | Meidar et al. |
| 2017/0074649 | A1 | * | 3/2017 | Engel ........................ G06T 7/80 |

FOREIGN PATENT DOCUMENTS

| JP | 63-041312 A | 2/1988 |
| JP | 2010-105081 A | 5/2010 |
| JP | 2015-059008 A | 3/2015 |

* cited by examiner

*Primary Examiner* — James R Bidwell
(74) *Attorney, Agent, or Firm* — Harness, Dickey & Pierce, P.L.C.

(57) ABSTRACT

A workpiece supplying device includes a pallet that has a stepped portion and accommodates a workpiece, a vibration unit that applies vibration to the pallet, and a posture change unit that changes a posture of the workpiece.

20 Claims, 13 Drawing Sheets

WORKPIECE SUPPLYING DEVICE, ROBOT, AND ROBOT SYSTEM

CROSS-REFERENCE TO RELATED APPLICATIONS

This application is a continuation of U.S. patent application Ser. No. 15/200,521, filed Jul. 1, 2016, which claims priority to Japanese Patent Applications No. 2015-152889, filed Jul. 31, 2015, and No. 2015-152890, filed Jul. 31, 2015, the disclosures of which are hereby expressly incorporated by reference herein in their entireties.

BACKGROUND

1. Technical Field

The present invention relates to a workpiece supplying device, a robot, and a robot system.

2. Related Art

In the related art, in a manufacturing line in which mechanical assembly work of products is performed, a plurality of manufacturing processes are included, components necessary for each manufacturing process are supplied, and each of the supplied components is grasped by a robot or the like through image recognition or the like and is moved to a necessary position, thereby being assembled.

JP-A-2010-105081 discloses a bottle picking device in which the bottom surface of a pallet accommodating workpieces and four wall surfaces of the pallet are divided, the bottom surface of the pallet and the wall surfaces of the pallet can relatively move upward/downward, and the heights of the wall surfaces of the pallet are changed in accordance with the heights of the workpieces inside the pallet.

JP-A-2015-059008 discloses a chip component supplying device in which when chip components are transported by vibrating a transportation path mounted with the chip components supplied to a pickup device, the chip components overlapping each other on the transportation path are scattered due to vibration of the transportation path.

However, in the bottle picking device of JP-A-2010-105081, the postures of a portion of the supplied workpieces are not in the desired postures. Therefore, there have been cases where the above-referenced portion of the workpieces cannot be picked up by the bottle picking device.

In the chip component supplying device of JP-A-2015-059008, there is no consideration of transporting the chip components inside the transportation path when the chip components are transported to the pickup device such that the period in which the pickup device picks up no chip component is reduced. Therefore, there have been cases where efficiency of work performed by the pickup device is insufficient.

SUMMARY

One aspect of the invention is directed to a workpiece supplying device including a pallet that has a stepped portion and accommodates a workpiece, and a vibration unit that applies vibration to the pallet, in which the pallet includes a posture change unit which changes a posture of the workpiece.

With this configuration, the workpiece supplying device changes the posture of the workpiece. Accordingly, the workpiece supplying device can change a posture of a supplying workpiece to a desired posture.

In another aspect of the invention, the workpiece supplying device may be configured such that the posture change unit includes a first posture change unit which is provided on an upper surface of the stepped portion and changes the posture of the workpiece.

With this configuration, the workpiece supplying device changes the posture of the workpiece by using the first posture change unit provided on the upper surface of the stepped portion. Accordingly, the workpiece supplying device can change the posture of the workpiece to the desired posture by using the first posture change unit provided on the upper surface of the stepped portion.

In another aspect of the invention, the workpiece supplying device may be configured such that the first posture change unit includes a mounting portion in which the workpiece can be mounted and moved.

With this configuration, in the workpiece supplying device, the workpiece can be mounted and moved in the mounting portion. Accordingly, the workpiece supplying device can change the posture of the workpiece to the desired posture by moving the workpiece mounted in the mounting portion.

In another aspect of the invention, the workpiece supplying device may be configured to include a rotary portion that rotates the mounting portion.

With this configuration, the workpiece supplying device rotates the mounting portion. Accordingly, the workpiece supplying device can change the posture of the workpiece mounted in the mounting portion to the desired posture by rotating the mounting portion.

In another aspect of the invention, the workpiece supplying device may be configured such that the posture change unit includes a second posture change unit which is provided on a stepped surface of the stepped portion and changes the posture of the workpiece.

With this configuration, the workpiece supplying device changes the posture of the workpiece by using the second posture change unit provided on the stepped surface of the stepped portion which is included in the pallet. Accordingly, the workpiece supplying device can change the posture of the workpiece to the desired posture by using the second posture change unit provided on the stepped surface of the stepped portion which is included in the pallet.

In another aspect of the invention, the workpiece supplying device may be configured such that the second posture change unit is a protrusion which is provided on the stepped surface.

With this configuration, the workpiece supplying device changes the posture of the workpiece by using the protrusion provided on the stepped surface. Accordingly, the workpiece supplying device can change the posture of the workpiece to the desired posture by using the protrusion provided on the stepped surface.

In another aspect of the invention, the workpiece supplying device may be configured such that the posture change unit includes a third posture change unit which is provided on any one or both of a lower surface of the stepped portion and a stepped surface of the stepped portion and changes the posture of the workpiece.

With this configuration, the workpiece supplying device changes the posture of the workpiece by using the third posture change unit provided on any one or both of the lower surface of the stepped portion and the stepped surface of the stepped portion which are included in the pallet. Accordingly, the workpiece supplying device can change the posture of the workpiece to the desired posture by using the third posture change unit provided on any one or both of the lower surface of the stepped portion and the stepped surface of the stepped portion which are included in the pallet.

In another aspect of the invention, the workpiece supplying device may be configured such that the third posture change unit is a nozzle which ejects gas.

With this configuration, the workpiece supplying device ejects gas from the third posture change unit provided on any one or both of the lower surface and the stepped surface of the stepped portion included in the pallet. Accordingly, the workpiece supplying device can change the posture of the workpiece to the desired posture by ejecting gas from the third posture change unit.

In another aspect of the invention, the workpiece supplying device may be configured such that the posture change unit overturns the workpiece.

With this configuration, the workpiece supplying device overturns the workpiece. Accordingly, the workpiece supplying device can change the posture of the workpiece to the desired posture by overturning the workpiece.

In another aspect of the invention, the workpiece supplying device may be configured such that the pallet includes an arc portion in a planar view.

With this configuration, the workpiece supplying device applies vibration to the pallet including the arc portion in a planar view, by using the vibration unit. Accordingly, the workpiece supplying device can supply the workpiece along the arc portion of the pallet due to vibration of the vibration unit. As a result thereof, the workpiece supplying device can cause the workpiece that has not been picked up to circle around along the arc portion.

In another aspect of the invention, the workpiece supplying device may be configured such that the arc portion has a substantial ring shape which includes a cut-off portion and is obtained by excluding a circle having a second radius that is a radius shorter than a first radius from a circle having the first radius, and on a mounting surface of the pallet, a friction coefficient in a first region on an outer side beyond a third radius which is a length obtained by subtracting a half of the difference between the first radius and the second radius from the first radius is lower than a friction coefficient in at least a portion of a second region on an inner side within the third radius.

With this configuration, in the workpiece supplying device, the friction coefficient in the first region on the outer side beyond the third radius on the mounting surface of the pallet to which the workpiece is transported is lower than the friction coefficient in at least a portion of the second region on the inner side within the third radius. Accordingly, in the workpiece supplying device, the workpieces which are transported due to vibration can be prevented from gathering toward the outer circumference side of the pallet on the mounting surface of the pallet.

In another aspect of the invention, the workpiece supplying device may be configured such that the mounting surface of the pallet to which the workpiece is transported has a uniform friction coefficient.

With this configuration, in the workpiece supplying device, the mounting surface of the pallet to which the workpiece is transported has the uniform friction coefficient. Accordingly, in the workpiece supplying device, processing of the mounting surface of the pallet can be easily performed.

One aspect of the invention is directed to a robot which picks the workpiece from the workpiece supplying device according to any one of the aspects described above.

With this configuration, the robot picks the workpiece whose posture is changed by the workpiece supplying device. Accordingly, the robot can pick the workpiece whose posture is changed to the desired posture.

One aspect of the invention is directed to a robot system including the workpiece supplying device according to any one of the aspects described above, and the robot according to the aspect described above.

With this configuration, in the robot system, the robot picks the workpiece whose posture is changed by the workpiece supplying device. Accordingly, the robot system can pick the workpiece whose posture is changed to the desired posture.

As described above, the workpiece supplying device changes the posture of the workpiece. Accordingly, the workpiece supplying device can change the posture of the supplying workpiece to the desired posture.

The robot and the robot system pick the workpiece whose posture is changed by the workpiece supplying device. Accordingly, the robot and the robot system can pick the workpiece whose posture is changed to the desired posture.

One aspect of the invention is directed to a workpiece supplying device including a pallet that accommodates a workpiece and a vibration unit that applies vibration to the pallet, in which the vibration unit applies vibration in a case where the workpiece that becomes a picking target mounted in the pallet in an image-capturing range in which an image-capturing unit performs image-capturing does not satisfy a predetermined condition.

With this configuration, the workpiece supplying device applies vibration to the pallet in a case where the workpiece that becomes the picking target mounted in the pallet in the image-capturing range in which the image-capturing unit performs image-capturing does not satisfy a predetermined condition. Accordingly, the workpiece supplying device can efficiently supply the workpiece that becomes the picking target mounted in the pallet.

In another aspect of the invention, the workpiece supplying device may be configured such that the predetermined condition is a condition related to at least one of the number of the workpieces and a position of the workpiece.

With this configuration, the workpiece supplying device applies vibration to the pallet in a case where the workpiece that becomes the picking target mounted in the pallet in the image-capturing range in which the image-capturing unit performs image-capturing satisfies the condition related to at least one of the number of the workpieces and the position of the workpiece. Accordingly, the workpiece supplying device can efficiently supply the workpiece that becomes the picking target mounted in the pallet based on the condition related to at least one of the number of the workpieces and the position of the workpiece.

In another aspect of the invention, the workpiece supplying device may be configured to cause a picking device to preferentially pick the workpiece positioned in a region set within the image-capturing range in which the image-capturing unit performs image-capturing.

With this configuration, in the workpiece supplying device, the picking device picks the workpiece from that positioned in the region set within the image-capturing range in which the image-capturing unit performs image-capturing. Accordingly, in the workpiece supplying device, it is possible to pick up the workpiece preferentially from that transported prior to other workpieces among the workpieces which become the picking targets. As a result thereof, it is possible to efficiently supply the workpiece that becomes the picking target mounted in the pallet.

In another aspect of the invention, the workpiece supplying device may be configured such that the region includes at least a portion of an end portion of the image-capturing range in a transportation direction of the workpiece.

With this configuration, in the workpiece supplying device, the picking device picks the workpiece from that positioned in the region set in the image-capturing range in which the image-capturing unit performs image-capturing, that is, the region including at least a portion of the end portion of the image-capturing range in the transportation direction of the workpiece. Accordingly, in the workpiece supplying device, it is possible to pick up the workpiece preferentially from that which seems to be transported to the outside of the image-capturing range from the end portion of the image-capturing range due to vibration applied to the pallet by the vibration unit, among the workpieces which become the picking targets. As a result thereof, it is possible to efficiently supply the workpiece that becomes the picking target mounted in the pallet.

In another aspect of the invention, the workpiece supplying device may be configured such that the pallet has the arc portion in a planar view.

With this configuration, the workpiece supplying device supplies the workpiece by applying vibration to the pallet having the arc portion in a planar view. Accordingly, the workpiece supplying device can resupply the workpiece that has not been picked up, as the workpiece which becomes the picking target.

In another aspect of the invention, the workpiece supplying device may be configured such that the arc portion has a substantial ring shape which includes the cut-off portion and is obtained by excluding the circle having the second radius that is the radius shorter than the first radius from the circle having the first radius, and at least a portion of the mounting surface of the pallet is provided with a restraint portion which restrains the workpiece from moving toward the outer side in the first region on the outer side beyond the third radius which is length obtained by subtracting a half of the difference between the first radius and the second radius from the first radius.

With this configuration, the workpiece supplying device restrains the workpiece from moving toward the outer side beyond the third radius. Accordingly, in the workpiece supplying device, the workpieces can be prevented from gathering toward the first region of the pallet.

In another aspect of the invention, the workpiece supplying device may be configured such that the arc portion has a substantial ring shape which includes the cut-off portion and is obtained by excluding the circle having the second radius that is the radius shorter than the first radius from the circle having the first radius, and at least half the image-capturing range of the image-capturing unit is a portion of the first region on the outer side beyond the third radius is which the length obtained by subtracting a half of the difference between the first radius and the second radius from the first radius, on the mounting surface of the pallet.

With this configuration, in the workpiece supplying device, at least half the image-capturing range of the image-capturing unit is occupied by a portion of the first region on the outer side beyond the third radius of the arc portion of the pallet on the mounting surface of the pallet. Accordingly, for example, in a case where the workpieces gather toward the first region of the pallet, the workpiece supplying device can efficiently supply the workpiece that becomes the picking target mounted in the pallet.

In another aspect of the invention, the workpiece supplying device may be configured to cause the image-capturing unit to capture an image of the workpiece with the lapse of a predetermined standby time after vibration caused by the vibration unit stops.

With this configuration, in the workpiece supplying device, the image-capturing unit captures an image of the workpiece with the lapse of a predetermined standby time after vibration caused by the vibration unit stops. Accordingly, the workpiece supplying device can stand by until the change of the posture of the workpiece due to vibration caused by the vibration unit is settled. As a result thereof, the image-capturing unit can capture an image of the workpiece in a state where the posture of the workpiece is stable.

One aspect of the invention is directed to a robot which picks the workpiece from the workpiece supplying device according to any one of the aspects described above.

With this configuration, the robot picks the workpiece supplied by the workpiece supplying device. Accordingly, the robot can pick the workpiece which is efficiently supplied by the workpiece supplying device.

One aspect of the invention is directed to a robot system including an image-capturing unit, the workpiece supplying device according to any one of the aspects described above, and the robot according to the aspect described above.

With this configuration, the robot system picks the workpiece supplied by the workpiece supplying device. Accordingly, the robot system can pick the workpiece which is efficiently supplied by the workpiece supplying device.

As described above, the workpiece supplying device applies vibration to the pallet in a case where the workpiece that becomes the picking target mounted in the pallet in the image-capturing range in which the image-capturing unit performs image-capturing does not satisfy a predetermined condition. Accordingly, the workpiece supplying device can efficiently supply the workpiece that becomes the picking target mounted in the pallet.

The robot and the robot system pick the workpiece supplied by the workpiece supplying device. Accordingly, the robot and the robot system can pick the workpiece which is efficiently supplied by the workpiece supplying device.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, an embodiment will be described based on the drawings.

Embodiment

Figure 1:
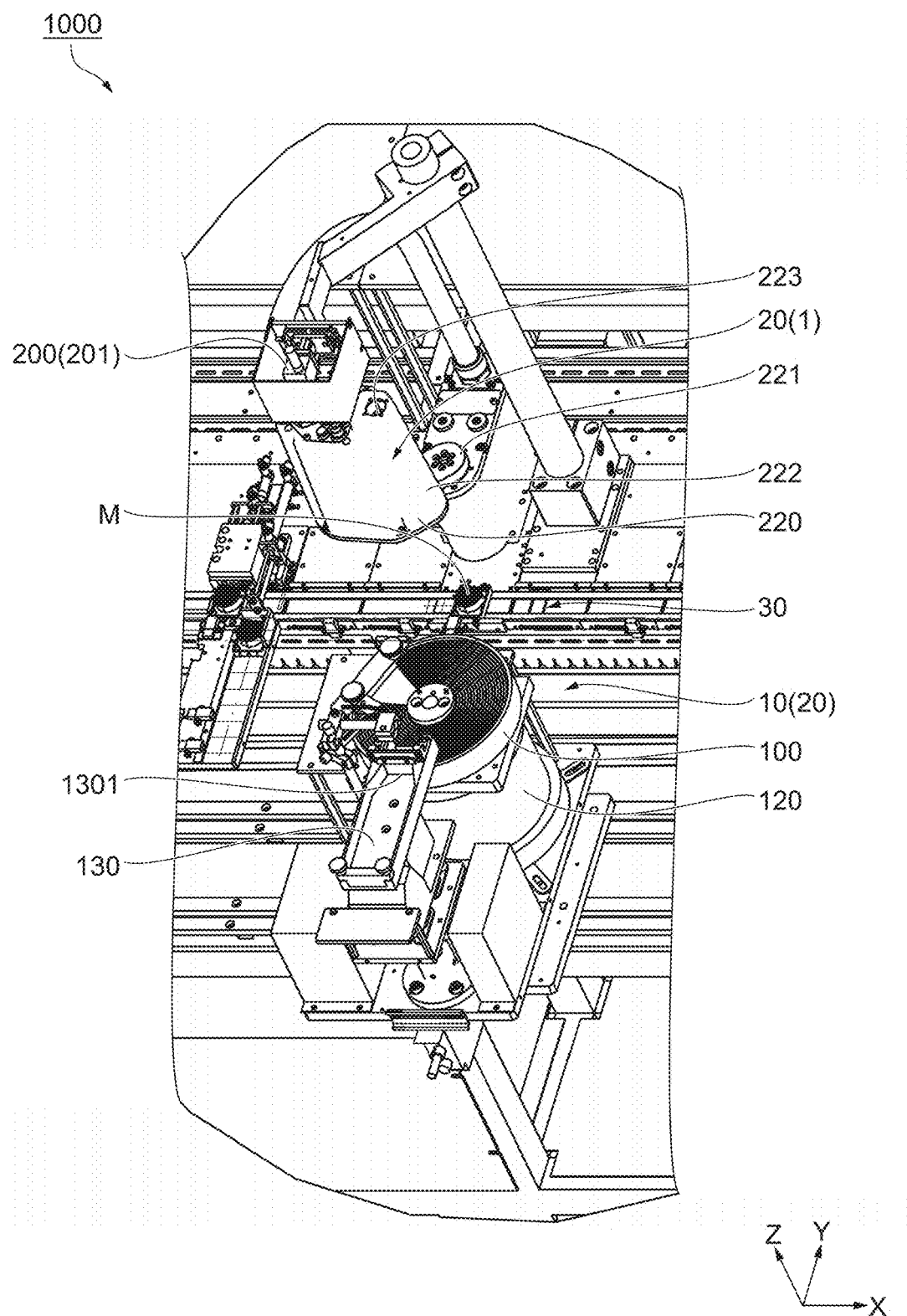
FIG. 1 is a perspective view illustrating a timepiece assembling apparatus of the present embodiment.
Figure 2:
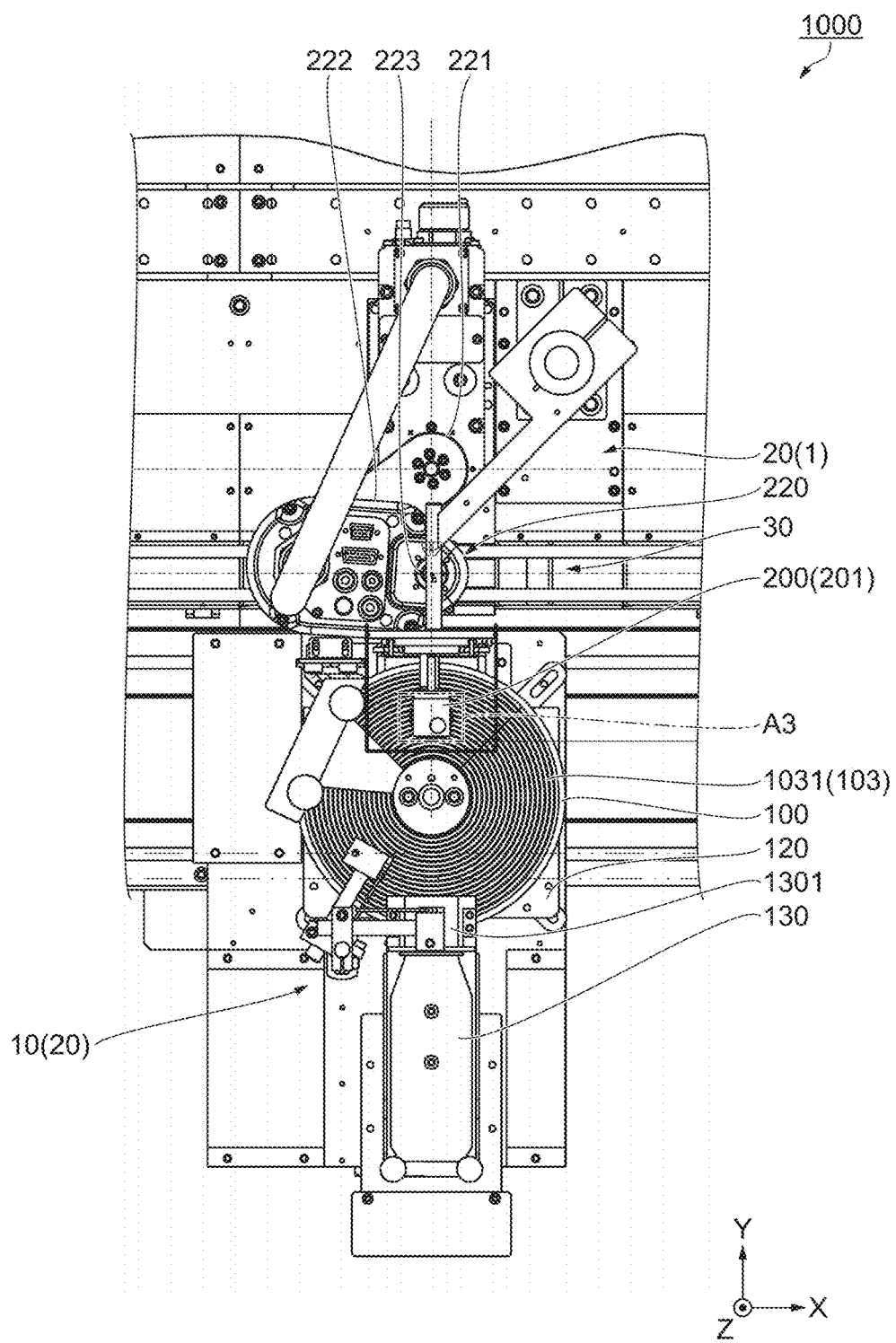
FIG. 2 is a plan view of the timepiece assembling apparatus viewed from above.

FIG. 1 is a perspective view illustrating a timepiece assembling apparatus 1 of the present embodiment. FIG. 2 is a plan view of the timepiece assembling apparatus 1 viewed from above. With reference to FIGS. 1 and 2, a configuration of the timepiece assembling apparatus 1 will be schematically described.

The timepiece assembling apparatus 1 of the present embodiment is set as an apparatus that carries out one of manufacturing processes (assembly processes) in a manufacturing line (timepiece assembly line 1000) in which mechanical assembly work of timepieces including a plurality of manufacturing processes is performed. The timepiece assembling apparatus 1 supplies a workpiece W of the timepiece (FIG. 8) necessary for the process thereof and repeatedly executes operations in which the supplied workpiece W is grasped by a pickup unit 220 through image recognition and is moved to a necessary position.

For the convenience of description, the drawings describing the present embodiment are illustrated while adopting the XYZ-orthogonal coordinate system. Specifically, in FIG. 1, the direction from the left side to the right side in the sheet (conveyance direction of the timepiece assembly line 1000) is referred to as an X-axis direction (positive X-direction). The direction from the hand-side to the outside in the sheet while being orthogonal to the X-axis direction is referred to as a Y-axis direction (positive Y-direction). The direction from the lower side to the upper side in the sheet while orthogonal to the X-axis direction and the Y-axis direction is referred to as a Z-axis direction (positive Z-direction). The directions are suitably used while having the positive X-direction as the forward direction (negative X-direction as the rearward direction), the positive Y-direction as the left direction (negative Y-direction as the right direction), and the positive Z-direction as the upward direction (negative Z-direction as the downward direction).

Specifically, the timepiece assembly line 1000 of the present embodiment is a line in which a movement M (assembling object component) that becomes the contents of the timepiece is assembled. The timepiece assembling apparatus 1 is an apparatus which causes a component (the workpiece W) called a setting lever (FIG. 8) to be embedded in the movement M in the timepiece assembly line 1000. The setting lever is a component engaging with a shaft called a winding stem to which a crown is attached, fixing the winding stem, and playing a role as a changeover switch for the crown when the time is adjusted.

The timepiece assembling apparatus 1 is configured to have a picking device 20 including a workpiece supplying device 10, and a transportation unit 30 transporting the assembling object component in which the workpiece W is embedded. The workpiece supplying device 10 is an apparatus which transports the workpiece W and supplies the workpiece W to the picking device 20. The picking device 20 is an apparatus which performs operations of picking up the workpiece W supplied from the workpiece supplying device 10, moving the workpiece W to the movement M being conveyed in the timepiece assembly line 1000, and causing the workpiece W to be embedded in the movement M. The picking device 20 and the workpiece supplying device 10 are installed in a form of interposing the transportation unit 30 which transports the movement M, therebetween.

The workpiece supplying device 10 is configured to include a pallet 100 which transports the workpiece W and has a circular shape in a planar view, a vibration unit 120 which is installed below the pallet 100 and applies vibration to the pallet 100, and a supply hopper 130 which is installed above the pallet 100 and supplies the workpiece W to the pallet 100. Accordingly, the workpiece W supplied to the supply hopper 130 falls from a tip portion 1301 onto the pallet 100 due to vibration of the supply hopper 130. The fallen workpiece W is transported (moves) in the circumferential direction along the front surface of the pallet 100 due to vibration of the pallet 100. In the present embodiment, the workpiece W is transported counterclockwise in a case where the pallet 100 is viewed in the upward direction.

The picking device 20 is configured to include the above-described workpiece supplying device 10, a detection unit 200, a lighting portion 210 (FIG. 9), the pickup unit 220, and a circuit unit (not illustrated). The detection unit 200 detects a position and a posture of the workpiece W inside the pallet 100 in the workpiece supplying device 10. The detection unit 200 may be configured to detect (count) the number of the workpieces W inside the pallet 100. The lighting portion 210 is installed on the rear surface side of the pallet 100 and performs irradiation of light toward the pallet 100. The pickup unit 220 picks up the workpiece W, moves the workpiece W to a predetermined position of the movement M being conveyed in the timepiece assembly line 1000, and causes the workpiece W to be embedded in a predetermined position inside the movement M.

The circuit unit includes a control unit (not illustrated), which instructs the pickup unit 220 to pick up the workpiece W based on a detection result of the detection unit 200. Thereafter, the control unit also instructs the pickup unit 220 to perform embedment with respect to the movement M. When the embedment ends, in a case where there is still the workpiece W which can be picked up and remains in the pallet 100, the picking device 20 repeats operations of picking up and embedment again. The control unit is stored in a portion (not illustrated) of the picking device 20.

Figure 3:
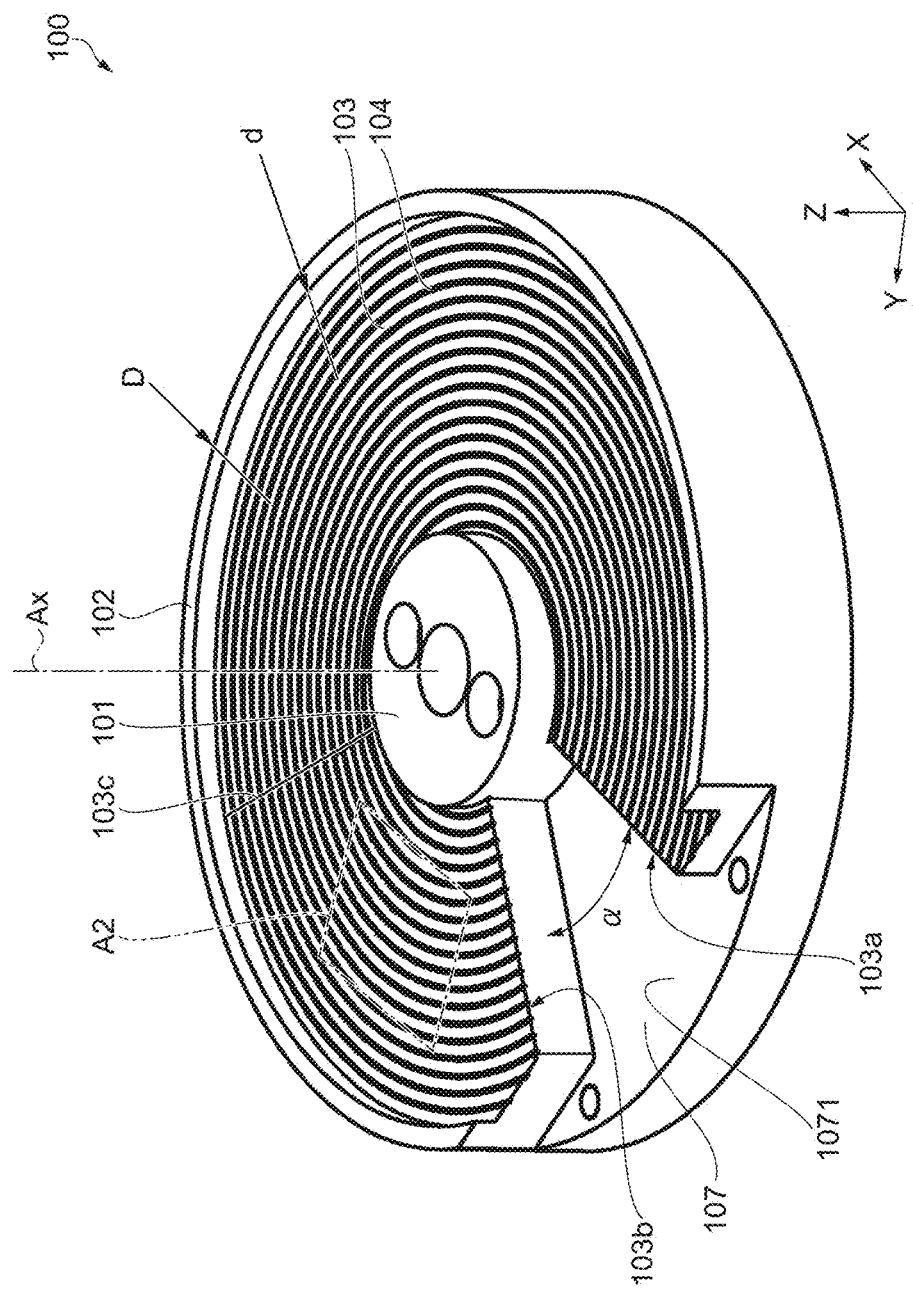
FIG. 3 is a view illustrating a cut-off portion of a pallet of a workpiece supplying device.
Figure 4:
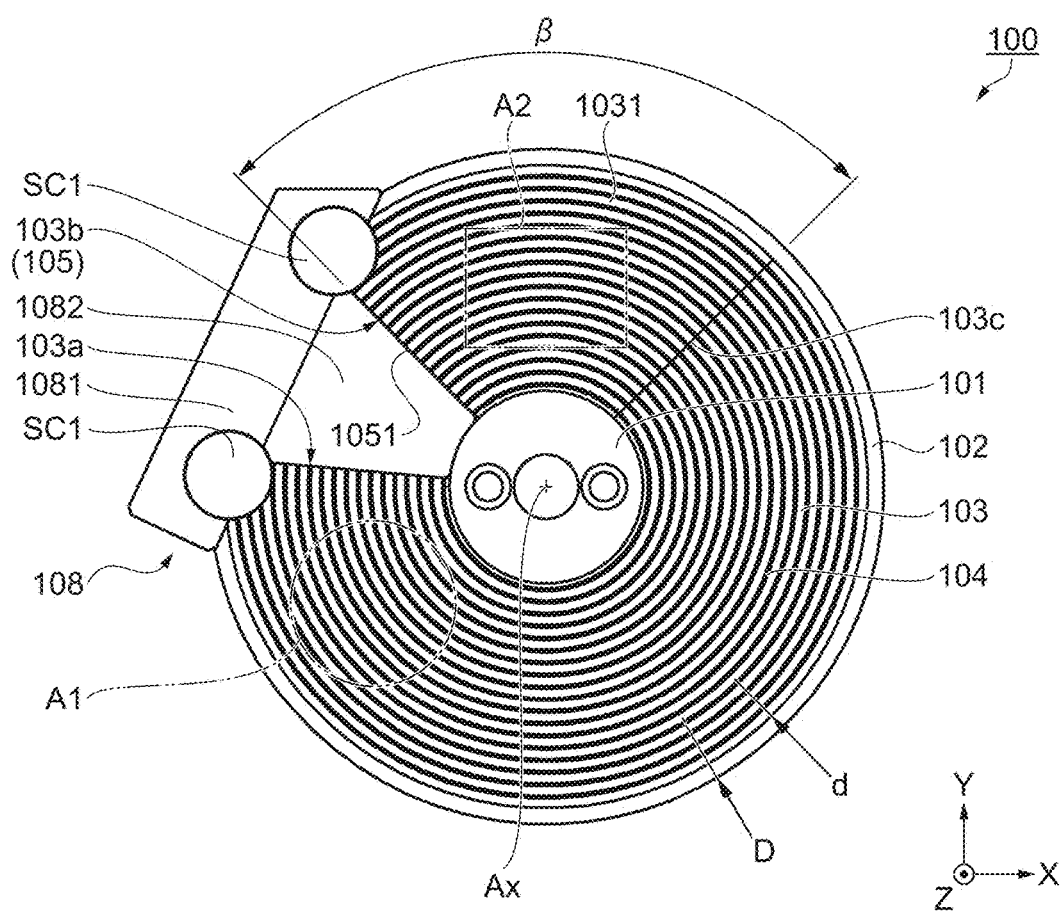
FIG. 4 is a plan view of the pallet (the pallet in which a cover is installed) viewed from above.
Figure 5:
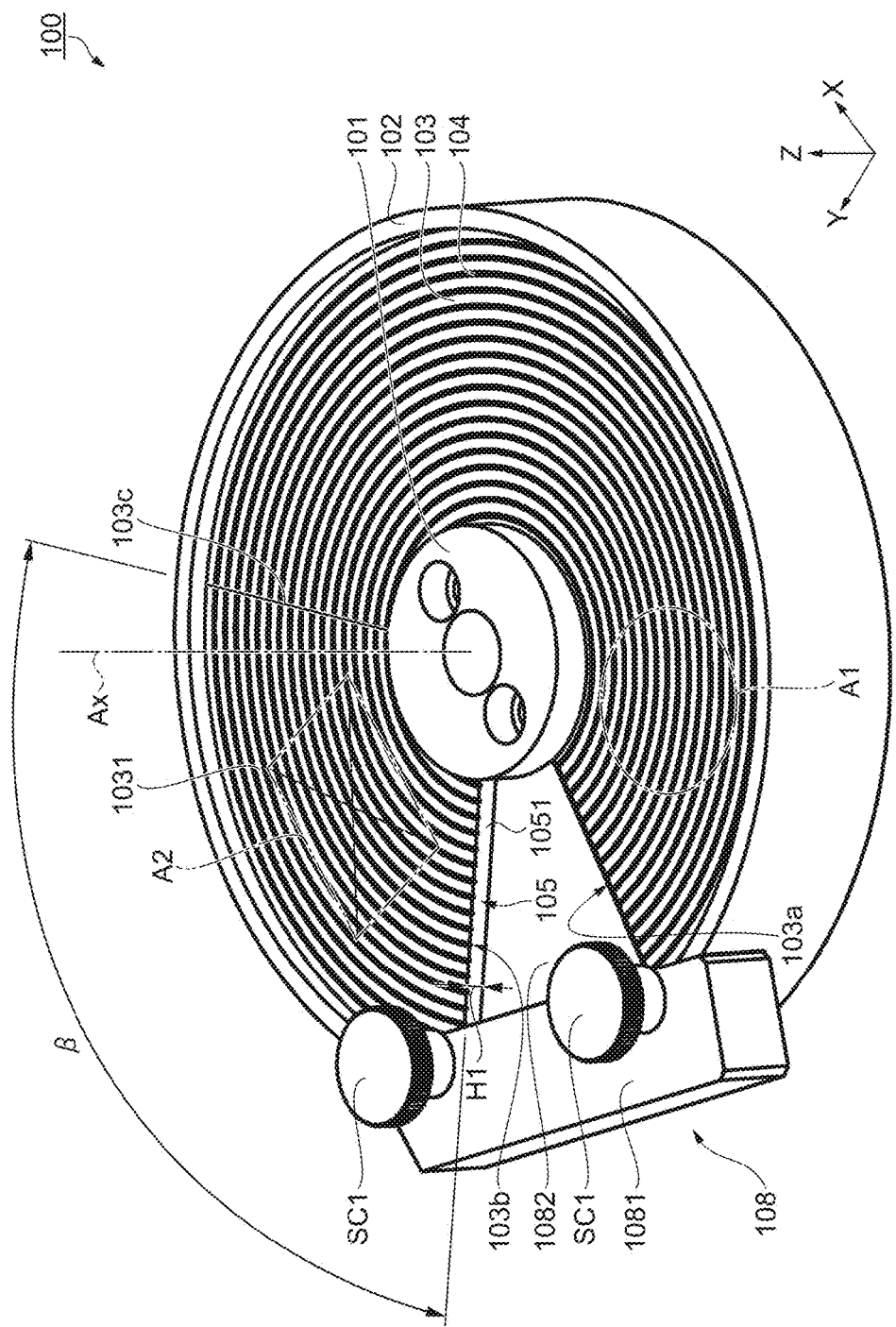
FIG. 5 is a perspective view illustrating the pallet.
Figure 6:
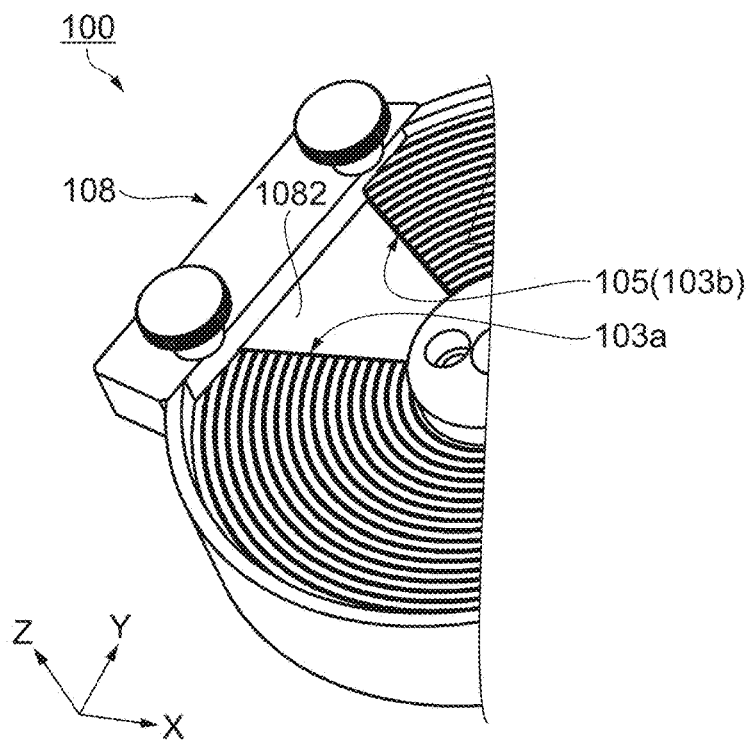
FIG. 6 is another perspective view illustrating the pallet.
Figure 7:
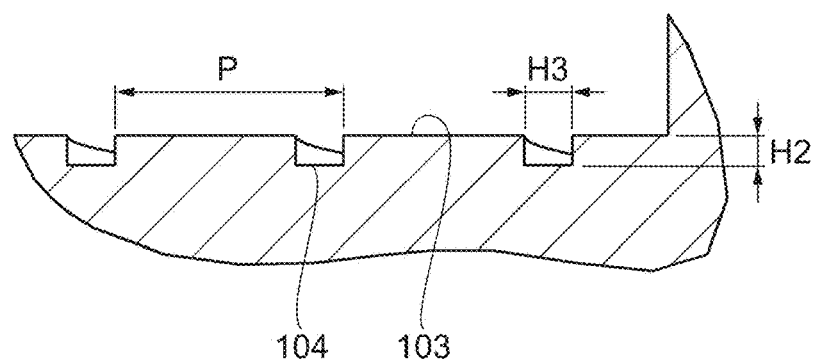
FIG. 7 is an enlarged cross-sectional view illustrating a groove portion.

FIG. 3 is a view illustrating a cut-off portion 107 of the pallet 100 of the workpiece supplying device 10. FIG. 4 is a plan view of the pallet 100 (the pallet 100 in which a cover 108 is installed) viewed from above. FIGS. 5 and 6 are perspective views illustrating the pallet 100. FIGS. 5 and 6 illustrate perspective views in states where the viewpoint is changed. FIG. 7 is an enlarged cross-sectional view illustrating groove portions 104. With reference to FIGS. 3 to 7, the configuration and the operation of the pallet 100 will be described.

As illustrated in FIGS. 3 to 5, the pallet 100 is formed to have a disk shape substantially centering around a central axis Ax. A cylindrical fixing portion 101 for fixing the pallet 100 to the vibration unit 120 which is installed below the pallet 100 is formed in a central portion of the pallet 100. An edge portion 102 configured to be positioned a step higher than a transportation surface portion 103 for transporting the workpiece W is formed in an outer circumferential portion of the pallet 100. The fixing portion 101 is also configured to have a height similar to that of the edge portion 102. Therefore, the transportation surface portion 103 is in a form of being interposed between the fixing portion 101 and the edge portion 102.

As illustrated in FIG. 3, the cut-off portion 107 is formed in a portion of the pallet 100. The cut-off portion 107 is widened at a predetermined angle α from the central axis Ax in the pallet 100. The outer circumferential portion is also partially cut off and is formed to have a cut-off surface portion 1071 which is positioned a step lower than the transportation surface portion 103.

In other words, the pallet 100 includes an arc portion in a planar view. The arc portion has a substantial ring shape which includes the cut-off portion 107 and is obtained by excluding a circle having a second radius that is a radius shorter than a first radius from a circle having the first radius. The circle having the first radius is a circle formed by the outer circumference of the pallet 100 in a planar view. In other words, the first radius is a radius of the circle formed by the outer circumference of the pallet 100 in a planar view. The circle having the second radius is the circle of the fixing portion 101 in a planar view. In other words, the second radius is a radius of the fixing portion 101 in a planar view.

Here, as illustrated in FIGS. 3 to 6, in the present embodiment, the transportation surface portion 103 is formed in a spiral state centering around the central axis Ax and having one round or less. Specifically, in a case where one end portion of the transportation surface portion 103 which is cut off due to the cut-off portion 107 is referred to as a leading end portion 103a, the other end portion is referred to as a trailing end portion 103b, and a portion returning clockwise from the trailing end portion 103b toward the leading end portion 103a by a predetermined angle β is referred to as a spiral trailing end portion 103c, the transportation surface portion 103 is formed in a so-called spiral state which gradually rises counterclockwise from the leading end portion 103a toward the spiral trailing end portion 103c. The transportation surface portion 103 from the spiral trailing end portion 103c to the extent of the trailing end portion 103b is formed to be a surface portion orthogonal to the central axis Ax. The surface portion is referred to as a flat surface portion 1031.

As illustrated in FIGS. 4 to 6, the cut-off portion 107 is blocked and the cover 108 is installed in the cut-off portion 107 of the pallet 100. The cover 108 is formed so as to cause the workpiece W to be transported to the blocked portion as well. Specifically, an outer shape configuration portion 1081 which is configured to have the outer shape of the pallet 100, and a transportation assistance surface portion 1082 which is configured to be the transportation surface portion 103 are integrated and form the cover 108. The transportation surface portion 103 including the transportation assistance surface portion 1082 is an example of the mounting surface of the pallet 100.

The transportation assistance surface portion 1082 of the cover 108 is formed in a spiral state similar to that of the transportation surface portion 103. Specifically, in a case where the cover 108 is installed in the cut-off portion 107, the spiral shape of the transportation surface portion 103 is also formed in the transportation assistance surface portion 1082 in a uniformly extending state. Accordingly, as illustrated in FIG. 5, a step difference is generated between the trailing end portion 103b of the transportation surface portion 103 and the transportation assistance surface portion 1082 of the cover 108. Hereinafter, the portion of the step difference will be referred to as a stepped portion 105. In the stepped portion 105, a side surface between the trailing end portion 103b of the transportation surface portion 103 and the transportation assistance surface portion 1082 of the cover 108 will be referred to as a stepped surface 1051 hereinafter. In other words, it is possible to mention that the stepped portion 105 includes the stepped surface 1051 intersecting the circumferential direction of the pallet 100.

The cover 108 is configured to be attachable/detachable with respect to the cut-off portion 107 and is fixed to the cut-off portion 107 by two screws SC1. The cover 108 is removed from the cut-off portion 107 in a case of switching the workpieces W to be transported to the pallet 100. A member (not illustrated) is installed in the cut-off portion 107, and the workpieces W which have been transported thus far are collected in the member. After the member is removed from the cut-off portion 107, the cover 108 is installed in the cut-off portion 107 again. Thereafter, workpieces W to be newly transported are input in the pallet 100.

A plurality of the groove portions 104 are formed in the transportation surface portion 103 of the pallet 100 in a concentric manner centering around the central axis Ax. Even though there is a protrusion on the outer surface of the workpiece W to be transported, the groove portions 104 serve as portions which restrain the workpiece W such that the posture of the workpiece W becomes a desired posture in the transportation surface portion 103, by guiding (leading) the protrusion into the groove portion 104. When the protrusion of the workpiece W is guided into the groove portion 104, the workpiece W is mounted on the transportation surface portion 103 in the desired posture, thereby being transported. In the present embodiment, as illustrated in FIGS. 4 and 7, eighteen groove portions 104 in total are formed at equal pitches P. No groove portion is formed in the transportation assistance surface portion 1082 of the cover 108 transporting the workpiece W.

In the present embodiment, the desired posture is a posture in which the pickup unit 220 can properly and reliably pick up the workpiece W. The detailed description will be given later. However, the desired posture indicates a posture in which the front surface of the workpiece W to be picked up is substantially parallel to the transportation surface portion 103 and is oriented in the upward direction. In other words, the protrusion of the workpiece W is guided into the groove portion 104, and the rear surface thereof comes into contact with the transportation surface portion 103. Hereinafter, for the convenience of description, the above-referenced posture will be referred to as a front surface posture in the description.

Here, the dimension value of each portion in the pallet 100 will be described. The workpiece W described below is considered to be the workpiece W including the setting lever and timepiece assembly components other than the setting lever. The pallet 100 of the present embodiment is also configured to be able to be used for transporting the setting lever and the components other than the setting lever.

As illustrated in FIGS. 3 and 4, an outer shape D of the pallet 100 measures ϕ210 mm, which is the maximum outer shape of the pallet allowed in the vibration unit 120. An inner diameter d of the pallet 100 measures ϕ200 mm, which is equal to ten times or greater than the outer shape dimensions (on the assumption that the maximum outer shape dimensions of the workpiece W measures 17 mm) of the workpiece W to be transported. As illustrated in FIG. 5, a step difference H1 of the stepped portion 105 measures 4 mm, which is equal to or greater than the minimum outer shape dimensions (on the assumption that the minimum outer shape dimensions of the workpiece W measures 4 mm) of the workpiece W.

As illustrated in FIG. 7, a depth H2 of each groove portion 104 measures 0.5 mm, and the height of the greatest protrusion of the workpiece W is assumed to measure 0.3 mm. A width H3 of each groove portion 104 measures 0.8 mm, and the diameter of the greatest protrusion of the workpiece W is assumed to measure 0.5 mm. The pitch P of the groove portions 104 measures 3.8 mm, which is set within a range from one time to two times the maximum dimensions of the outer shape of the workpiece W including a portion (projection portion) of the workpiece W which is guided into the groove portion 104.

The pallet 100, excluding the cover 108, is configured to have light-transmitting characteristics. In the present embodiment, the pallet 100 is configured to be made from a synthetic resin material having light-transmitting characteristics (in the present embodiment, a polycarbonate resin having light-transmitting characteristics). The cover 108 is configured to be made from a synthetic resin material having no light-transmitting characteristics.

Figure 8:
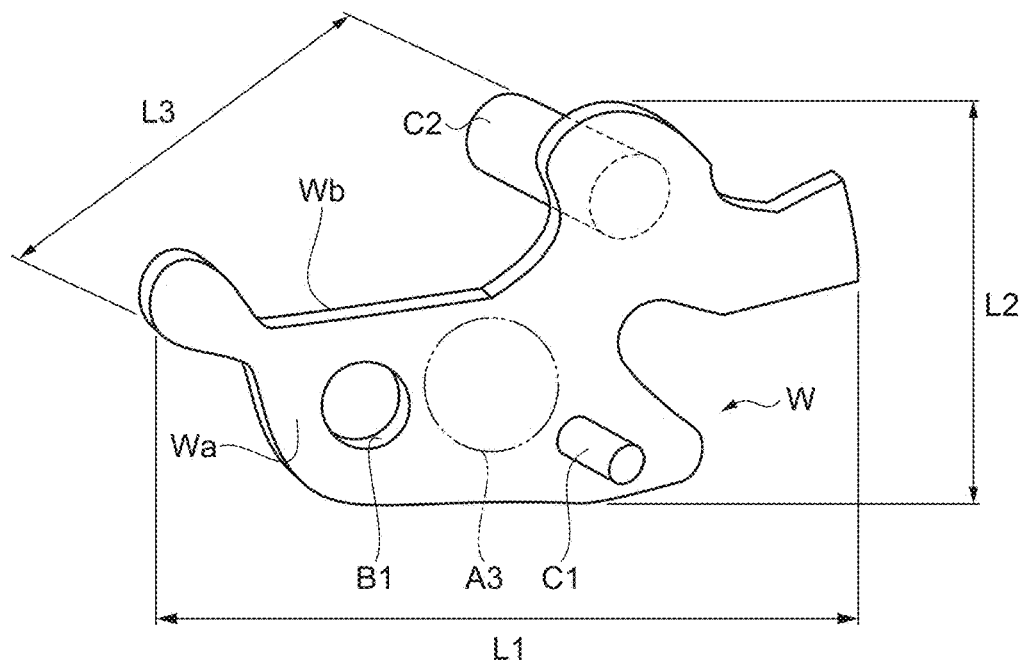
FIG. 8 is a perspective view illustrating a schematic shape of a workpiece.

FIG. 8 is a perspective view illustrating a schematic shape of the workpiece W. With reference to FIG. 8, description will be given regarding the shape of the setting lever which is the workpiece W of the present embodiment.

The workpiece supplying device 10 of the present embodiment supplies the setting lever as the workpiece W which is an assembly component of a timepiece. As illustrated in FIG. 8, the setting lever (hereinafter, will be referred to as the workpiece W) is formed to have the plate-like outer shape which is diversely indented. A penetrating hole portion B1 is formed in the workpiece W. A protrusion C1 protruding in a cylindrical manner is formed on a front surface Wa of the workpiece W, and a protrusion C2 protruding in a similarly cylindrical manner is formed on a rear surface Wb.

Dimensional relationships of the workpiece W (setting lever) illustrated in FIG. 8 will be schematically described. The height of the protrusion C1 of the workpiece W from the front surface Wa measures 0.3 mm. The height of the protrusion C2 from the rear surface Wb also measures 0.3 mm. The diameter of the protrusion C1 measures 0.3 mm, and the diameter of the protrusion C2 measures 0.4 mm. In the outer shape of the workpiece W, a length L1 in the longitudinal direction measures 5 mm, and a length L2 in the short direction (minimum outer shape) measures 2.5 mm.

In a case where the workpiece W formed as described above is mounted in the transportation surface portion 103, even if any surface of both sides (the front surface Wa and the rear surface Wb) of the workpiece W faces the transportation surface portion 103 side, the protrusion C1 or C2 comes into contact with the transportation surface portion 103 and the workpiece W tilts. Accordingly, the workpiece W cannot be stably mounted. Therefore, in the present embodiment, the protrusion C2 on the rear surface Wb side is guided into the groove portion 104 for the purpose of causing the rear surface Wb to be in a posture of being brought into contact with the transportation surface portion 103 (a posture in which the front surface Wa is oriented in the upward direction). The above-described posture becomes the front surface posture which is the desired posture. Hereinafter, for the convenience of description, the posture in which the front surface Wa is brought into contact with the transportation surface portion 103 will be referred to as a rear surface posture in the description.

In a case where the workpiece W is in the front surface posture, the below-described picking device 20 can pick up the workpiece W. In addition, the picking device 20 can perform embedment of the workpiece W with respect to the movement M at a movement destination after being picked up. In the present embodiment, the picking device 20 picks up the workpiece W through a portion on the surface of a pickup region A3 which is set on the front surface Wa. Specifically, in the present embodiment, the picking device 20 performs a pickup operation through suctioning.

Subsequently, description will be given regarding transportation of the workpieces W in the workpiece supplying device 10.

First, as illustrated in FIGS. 1 and 2, the workpieces W are supplied to the supply hopper 130. The supply is performed by a worker. The workpieces W supplied to the supply hopper 130 are input to the pallet 100 by falling from the tip portion 1301 onto the pallet 100 positioned below the tip portion 1301, due to vibration of the supply hopper 130. Specifically, as illustrated in FIGS. 4 and 5, the workpieces W are input to an input region A1 which becomes a portion slightly moving counterclockwise from the leading end portion 103a of the transportation surface portion 103 of the pallet 100.

The workpieces W input to the input region A1 begin to be transported counterclockwise toward the trailing end portion 103b in the transportation surface portion 103 of the pallet 100 due to vibration of the vibration unit 120. In the present embodiment, an electromagnetic type adopting an electromagnet is employed as the vibration unit 120. A piezoelectric type adopting a piezoelectric element, or the like may be employed as the vibration unit 120.

While the workpiece W moves in the transportation surface portion 103, there are cases where the protrusion C2 is guided into the groove portion 104 so that the workpiece W moves in a posture in which the rear surface Wb is in contact with the transportation surface portion 103 (the desired posture, that is, the front surface posture) and cases where the workpiece W moves not in the desired posture. In a case where the workpiece W passes through the spiral trailing end portion 103c of the transportation surface portion 103, the transportation surface portion 103 moves not on a surface which is inclined in a spiral state but in the flat surface portion 1031 which has a flat surface (a surface orthogonal to the central axis Ax).

In the present embodiment, a region where the below-described picking device 20 performs picking up is set in a region from the spiral trailing end portion 103c to the trailing end portion 103b of the transportation surface portion 103. Specifically, as illustrated in FIGS. 3 to 5, among the workpieces W, the workpiece W in the desired posture is picked up in a visual angle region A2 which is a substantially rectangular region.

The workpiece W not positioned within the visual angle region A2 or the workpiece W positioned within the visual angle region A2 but not in the front surface posture which is the desired posture moves in the flat surface portion 1031 and arrives at the trailing end portion 103b. The workpiece W still moves thereafter, and the workpiece W falls from the stepped portion 105 formed in the trailing end portion 103b onto the transportation assistance surface portion 1082 of the cover 108. The workpiece W which falls onto the transportation assistance surface portion 1082 moves in the transportation assistance surface portion 1082 and arrives at the leading end portion 103a. Thereafter, the workpiece W repeats movement again.

As described above, a course of transporting the workpiece W in the pallet 100 of the workpiece supplying device 10 corresponds to a transportation process in a picking method. The picking method of the present embodiment includes the transportation process, a detection process, and a pickup process. The detection process and the pickup process will be sequentially described hereinafter.

The pitch P of the groove portions 104 measures 3.8 mm. In the present embodiment, the pitch P thereof is set to one time the maximum dimensions (L3) to the extent of the outer shape of the workpiece W including the protrusion C2 of the workpiece W guided into the groove portion 104. Accordingly, even in a case where the protrusions C2 of the workpieces W are respectively guided into the groove portion 104 and an adjacent groove portion 104, transportation in which the workpiece W and the different workpiece W overlap each other is reduced as much as possible. Moreover, separation of the workpieces W from the groove portion 104 caused by mutual collision of the workpieces W, and the like is reduced. Thus, stable transportation is conducted.

The step difference H1 of the stepped portion 105 measures 4 mm, and the minimum outer shape dimensions (L2) of the workpiece W of the present embodiment measures 2.5 mm. Accordingly, the probability of the posture of the workpiece W being in the front surface posture which is the desired posture (the posture in which the protrusion C2 is guided into the groove portion 104) through successive transportation is improved by causing the workpiece W that has not been picked up to fall from the stepped portion 105.

Subsequently, the configuration and the operation of the picking device 20 will be described.

The picking device 20 of the present embodiment is configured to include the above-described workpiece supplying device 10, the detection unit 200, the lighting portion 210, the pickup unit 220, and the circuit unit (not illustrated) including the control unit. As illustrated in FIGS. 1 and 2, the detection unit 200 detects the position and the posture of the workpiece W inside the pallet 100 in the workpiece supplying device 10. The detection unit 200 includes an image-capturing unit 201 which acquires image data of the workpiece W inside the pallet 100. The image-capturing unit 201 is configured to be a camera adopting a charge coupled device (CCD). The detection unit 200 is installed above the flat surface portion 1031 of the pallet 100 and captures an image within the visual angle region A2 which is set in the flat surface portion 1031. The visual angle region A2 is an example of the image-capturing range.

Figure 9:
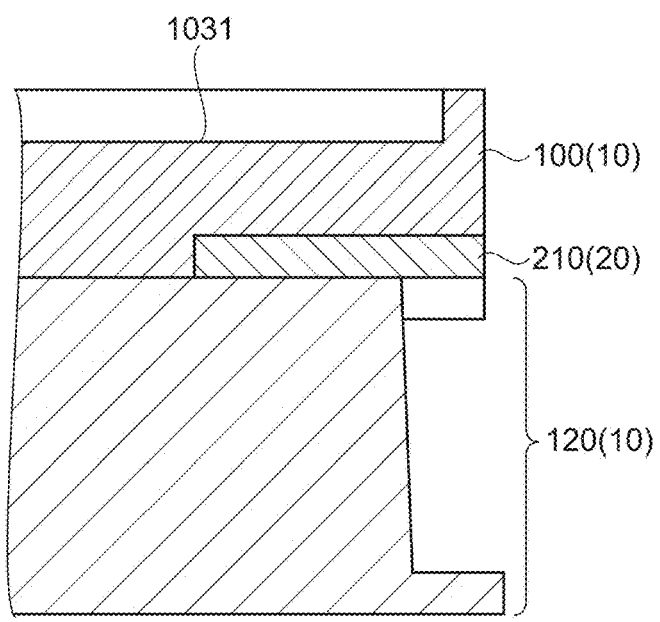
FIG. 9 is a schematic side sectional view illustrating a lighting portion.

FIG. 9 is a schematic side sectional view illustrating the lighting portion 210. With reference to FIG. 9, the configuration and the operation of the lighting portion 210 will be described.

The picking device 20 includes the lighting portion 210 which assists image-capturing performed by the detection unit 200. As illustrated in FIG. 9, the lighting portion 210 is configured to have a flat plate shape and is installed on the rear surface side of the pallet 100 where the pallet 100 is partially cut off. Specifically, the lighting portion 210 is installed at a cut-off place of the rear surface side of the pallet 100 which is positioned toward the downward direction of the flat surface portion 1031 of the pallet 100. The lighting portion 210 is configured to adopt a light emitting diode (LED). The lighting portion 210 performs irradiation of light toward the pallet 100 positioned thereabove.

The pallet 100 is configured to have light-transmitting characteristics as described above and transmits light from the lighting portion 210. Particularly, the flat surface portion 1031 facing the lighting portion 210 maximally transmits light. However, in the present embodiment, the pallet 100 in its entirety transmits light as well. In contrast, since the workpiece W inside the pallet 100 is configured to be made from metal in the present embodiment, the workpiece W blocks light which has been transmitted through the pallet 100 (the transportation surface portion 103). Accordingly, in a case where the image-capturing unit 201 captures an image of the visual angle region A2, the contrast ratio of the workpiece W and the pallet 100 can be improved, and thus, the image of the position (shape) or the posture of the workpiece W can be clearly captured.

Figure 10:
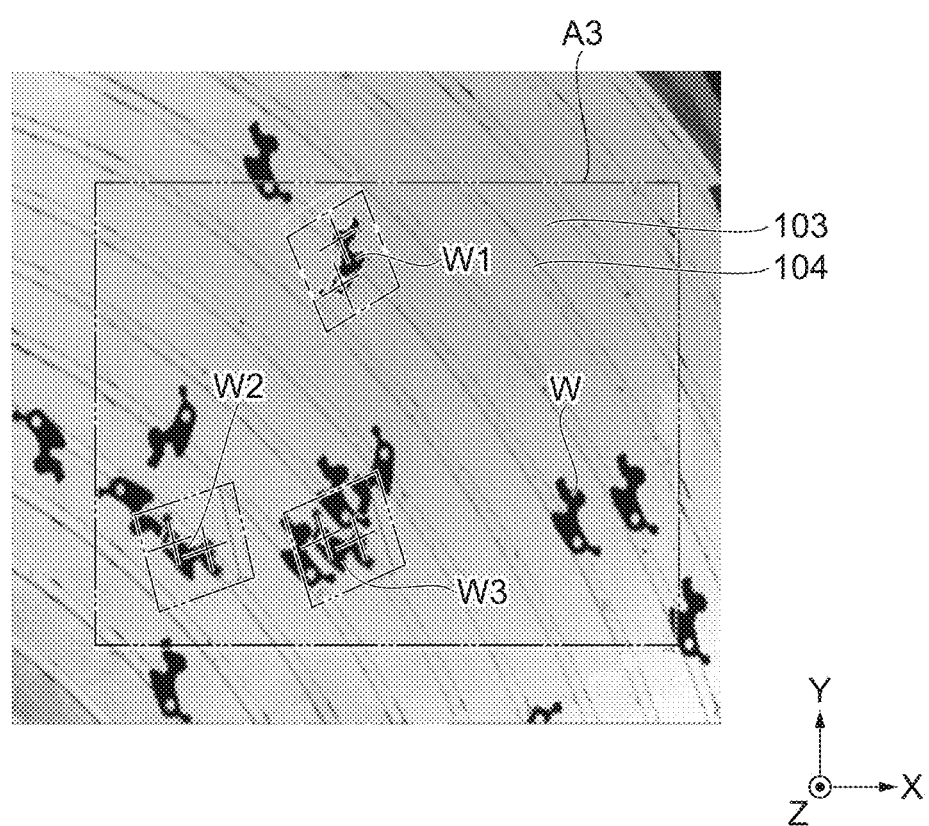
FIG. 10 is a view illustrating an image of a visual angle region captured by a detection unit (image-capturing unit).

FIG. 10 is a view illustrating an image of the visual angle region A2 captured by the detection unit 200 (image-capturing unit 201). With reference to FIG. 10, the operation of the control unit will be described.

The control unit analyzes (performs image processing) an image as a detection result from the detection unit 200 and selects the workpiece W whose protrusion C2 is guided into the groove portion 104 and whose front surface Wa is oriented in the upward direction. FIG. 10 illustrates a state where three workpieces W such as workpieces W1, W2, and W3 are selected as the workpieces W in the front surface postures which are the desired postures (the workpieces W which become pickup targets, or the workpieces W which become picking targets) as a result after the control unit has performed the image processing. The workpiece W whose protrusion C1 on the front surface Wa is guided into the groove portion 104 and whose rear surface Wb is oriented in the upward direction, that is, the workpiece W in the rear surface posture is not selected as the pickup target through the image processing performed by the control unit, even though the posture thereof is not inclined and is stable.

In a case where the detection unit 200 captures an image of the workpiece W, the control unit issues an instruction to stop transportation of the workpiece W performed by the pallet 100 (stopping vibration of the vibration unit 120). A pickup period that is a period in which the workpiece W stops being transported becomes a period from the time when the image is captured to the time when the last workpiece W that has been selected is picked up. In a case where the pickup period elapses (the last workpiece W is picked up), the control unit issues an instruction again to drive the vibration unit 120 so as to vibrate the pallet 100. Accordingly, when the vibration unit 120 starts to vibrate, the pallet 100 restarts transportation of the workpieces W. In this manner, in the present embodiment, the control unit causes the vibration unit 120 to be intermittently driven.

In a case where the workpieces W (the workpieces W1, W2, and W3) which become the pickup targets are selected through the image processing, the control unit thereafter outputs an instruction to the pickup unit 220 so as to pick up the target workpieces W1, W2, and W3. The pickup unit 220 starts the pickup operation upon the instruction received from the control unit.

As described above, an operation in which an image of the workpiece W that is transported through the transportation process is captured by the detection unit 200 (image-capturing unit 201) of the picking device 20, and the workpiece W that becomes the pickup target is selected by the control unit based on the image-captured data through the image processing corresponds to the detection process in the picking method. As described above, the image-capturing unit 201 captures an image of workpiece W which is transported to the visual angle region A2 of the pallet 100.

As illustrated in FIGS. 1 and 2, the pickup unit 220 is configured to be a horizontally articulated robot (so-called SCARA robot). The pickup unit 220 is configured to include a first arm 221, a second arm 222, and a pickup shaft 223 which is movably installed inside the second arm 222. The pickup unit 220 moves in an X-direction and a Y-direction by using the first arm 221 and the second arm 222 and moves in a Z-direction by using the shaft 223. In the present embodiment, the pickup unit 220 (particularly, the second arm 222) is movably installed between the pallet 100 and the image-capturing unit 201.

In a case where the pickup unit 220 receives an instruction from the control unit so as to pick up the workpiece W1, the pickup unit 220 drives the first arm 221 and the second arm 222 based on positional data of the workpiece W1 in the pickup region A3 instructed by the control unit, and the pickup unit 220 causes the shaft 223 to be positioned above the pickup region A3. Thereafter, the shaft 223 moves downward, and the workpiece W1 is picked up by using a picking tool (not illustrated) which is installed in the tip portion of the shaft 223. In the present embodiment, picking-up is performed through adsorption adopting air.

After picking up the workpiece W1, the pickup unit 220 subsequently executes an operation which is stored through teaching. Specifically, the pickup unit 220 moves the picked-up workpiece W1 to a place above the movement M. Subsequently, the shaft 223 is lowered, thereby performing an embedment operation by plunging the workpiece W1 into the movement M at a predetermined position. In this manner, the operations from when the pickup unit 220 picks up the workpiece W until when the workpiece W is embedded in the movement M become a series of operations.

In a case where the series of operations end, the pickup unit 220 thereafter repeats the series of operations with respect to the workpieces W2 and W3 in a manner similar to that described above. The pickup unit 220 picks up the last workpiece W3 and causes the last workpiece W3 to be embedded in the movement M, thereby ending the current operation. The pickup unit 220 stands by in a predetermined position until the next instruction is received from the control unit. In a case where set conditions are satisfied (in the present embodiment, after the lapse of a predetermined time) the control unit outputs an instruction to the detection unit 200 so as to capture an image. Thereafter, the control unit performs controlling similar to that described above.

A cycle time of the timepiece assembly line 1000 of the present embodiment is set to 2.5 seconds. The timepiece assembling apparatus 1 of the present embodiment is operated under the cycle time less than 2.5 seconds, thereby catching up the delay occurring in other processes in the timepiece assembly line 1000.

As described above, an operation of causing the pickup unit 220 to pick up the workpiece W detected through the detection process corresponds to the pickup process in the picking method. As described above, picking is performed with respect to the workpiece W which has become the pickup target through an analysis of the image performed by the control unit.

According to the above-described embodiment, the below-described effects can be obtained.

According to the workpiece supplying device 10 of the present embodiment, in a case where the shape of the workpiece W is a shape in which the protrusion C2 is present on the rear surface Wb and the workpiece W tilts when being placed on a plane surface, the protrusion C2 which is a factor causing the tilt is guided into the groove portion 104 disposed on the front surface of the pallet 100 in an arc state. Therefore, the workpiece W can be supplied such that the posture thereof becomes the desired posture. The workpiece W which is not guided into the groove portion 104 (the workpiece W which is not in the desired posture) is caused to fall from the stepped portion 105 having the stepped surface 1051 intersecting the circumferential direction of the pallet 100. Thus, it is possible to improve the probability of being in the desired posture by causing the position of the workpiece W to be transported so as to deviate from that in the previous transportation, turning the workpiece W upside down, and the like.

According to the workpiece supplying device 10 of the present embodiment, since the plurality of groove portions 104 are disposed in a concentric manner, the number of the workpieces W in the desired postures can be efficiently increased with respect to the workpieces W having the shapes in which the workpieces W tilt when being placed on a plane surface. When the number of the workpieces W guided into the groove portions 104 increases, separation of the workpieces W from the groove portion 104 caused by mutual collision of the workpieces W, and the like is reduced. Thus, stable transportation can be conducted.

According to the workpiece supplying device 10 of the present embodiment, the flat surface portion 1031 which becomes a surface portion orthogonal to the central axis Ax of the pallet 100 is included in the vicinity of the stepped portion 105. Therefore, in a case where the workpiece W which is guided into the groove portion 104 and is in the desired posture is positioned in the flat surface portion 1031, the picking device 20 (the pickup unit 220) can pick up the workpiece W. Accordingly, compared to a case where picking-up is performed in the transportation surface portion 103 in a spiral state (intersecting the central axis Ax in an inclined manner) other than the flat surface portion 1031, the workpiece W can be accurately picked up in a stable posture.

According to the workpiece supplying device 10 of the present embodiment, in the pallet 100, when irradiation of light is performed from below the pallet 100, there are cases where the light is entirely transmitted due to light-transmitting characteristics thereof, and there are cases where the light is blocked by the workpiece W. Accordingly, the position (shape) or the posture of the workpiece W can be clarified.

According to the workpiece supplying device 10 of the present embodiment, the pallet 100 is configured to include a synthetic resin material (in the present embodiment, a polycarbonate resin) having light-transmitting characteristics. Thus, the pallet 100 having light-transmitting characteristics can be easily formed.

According to the picking device 20 of the present embodiment, with respect to the workpieces W supplied by the workpiece supplying device 10, the workpiece W can be easily and accurately picked up by the pickup unit 220 due to the detection of the position and the posture of the workpiece W performed by the detection unit 200, and the instruction issued to the pickup unit 220 by the control unit based on the detection result of the detection unit 200.

According to the picking device 20 of the present embodiment, when the lighting portion 210 included on the rear surface side of the pallet 100 irradiates the pallet 100 with light, the light can be transmitted due to light-transmitting characteristics which the pallet 100 has. Accordingly, since the contrast between the workpiece W and the surroundings can be improved, in a case where the detection unit 200 includes the image-capturing unit 201 which acquires the image data of the workpiece W, image-capturing can be performed with a high contrast, and detection of the position and the posture of the workpiece W can be more accurately performed.

According to the timepiece assembling apparatus 1 of the present embodiment, including the workpiece supplying device 10 supplying the workpiece W which is necessary to assemble a timepiece such that the posture of the workpiece W is in the desired posture, since there is provided the picking device 20 which accurately picks up the supplied workpiece W, the timepiece can be accurately assembled, and thus, improvement of the cycle time can be realized.

According to the picking method of the present embodiment, the groove portions 104 of the workpiece supplying device 10 are set to have the pitch P within a range from one time to two times the maximum dimensions of the outer shape of the workpiece W including the protrusion C2 which is guided into the groove portion 104. Accordingly, in the transportation process of the workpiece supplying device 10, even in a case where the protrusions C2 of the workpieces W are respectively guided into the groove portion 104 and an adjacent groove portion 104, transportation of the workpiece W and the different workpiece W in an overlapping state is reduced as much as possible. Moreover, separation of the workpieces W from the groove portion 104 caused by mutual collision of the workpieces W, and the like is reduced. Thus, stable transportation can be conducted. In addition, it is possible to perform efficient transportation without generating useless space.

Without being limited to the above-described embodiment, the invention can be executed by applying various changes, improvements, and the like without departing from the gist and the scope thereof. Modification examples will be described below.

The timepiece assembling apparatus 1 of the embodiment is an apparatus causing the setting lever as the workpiece W which is a timepiece assembling component to be embedded in the movement M. However, without being limited thereto, the workpiece W can be applied as long as the workpiece W is a component which has the protrusion, the protrusion of which is guided into the groove portion, and then, which can be transported.

In the workpiece supplying device 10 of the embodiment, no groove portion is formed in the transportation assistance surface portion 1082 of the cover 108 in which the workpiece W is transported. However, without being limited thereto, the transportation assistance surface portion 1082 may also include the groove portions leading to the groove portions 104 of the transportation surface portion 103.

The workpiece supplying device 10 of the embodiment copes with multiple types of the workpieces W by installing the cover 108 in the pallet 100 in an attachable/detachable manner, and thus, general-purpose properties of the workpiece supplying device 10 are improved. However, without being limited thereto, in a case where the apparatus may be a dedicated workpiece supplying device which transports designated workpieces W, a portion of the cover 108 may be caused to serve as the transportation surface portion, without installing the cover 108.

In the workpiece supplying device 10 of the embodiment, the pallet 100 in its entirety excluding the cover 108 may be formed to have light-transmitting characteristics. However, without being limited thereto, the portion having light-transmitting characteristics may be a portion corresponding to at least the region in which an image of the workpiece W is captured. In the present embodiment, a portion corresponding to the visual angle region A2 may have light-transmitting characteristics.

In the workpiece supplying device 10 of the embodiment, the pallet 100 is formed from a synthetic resin material having light-transmitting characteristics. However, without being limited thereto, the pallet 100 may be formed to include a glass material having light-transmitting characteristics.

In the picking device 20 of the embodiment, the lighting portion 210 is not limited to the LED and may be configured to adopt other types of light-emitting means such as a cold cathode tube, an organic electroluminescence (EL), and the like.

MODIFICATION EXAMPLE 1 OF EMBODIMENT

Hereinafter, with reference to FIGS. 11 and 12, Modification Example 1 of the present embodiment will be described. The workpiece supplying device 10 according to the above-described embodiment may be configured to include the below-described pallet 100a in place of the pallet 100. The below-described pallet 100a may be applied to a configuration different from that of the above-described embodiment.

Figure 11:
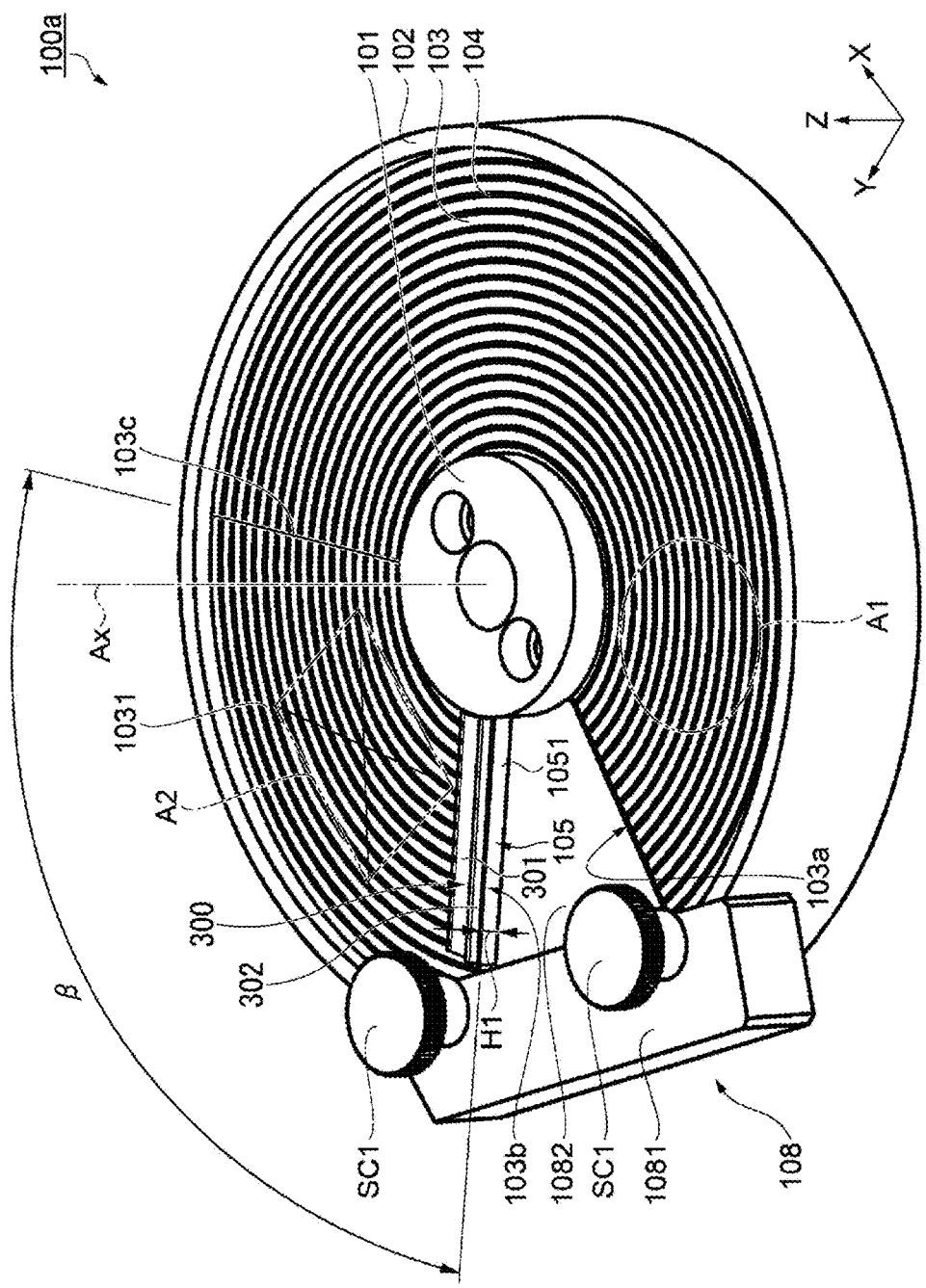
FIG. 11 is a perspective view illustrating an example of the pallet included in the workpiece supplying device of Modification Example 1 of the present embodiment.

FIG. 11 is a perspective view illustrating an example of the pallet 100a included in the workpiece supplying device 10 of Modification Example 1 of the present embodiment.

The pallet 100a is different from the pallet 100 and includes a first posture change unit 300 which changes the posture of the workpiece W. Accordingly, in the workpiece supplying device 10, the posture of the supplying workpiece W can be changed to the front surface posture (the posture in which the protrusion C2 is guided into the groove portion 104) which is the desired posture by the first posture change unit 300. The pallet 100a includes the first posture change unit 300 in a portion of the flat surface portion 1031 which is the upper surface of the stepped portion 105.

The first posture change unit 300 includes a mounting portion 301, a fall prevention wall portion 302, and a rotary portion 303.

The mounting portion 301 is provided in a portion of the flat surface portion 1031 including the trailing end portion 103b of the pallet 100a. In other words, in Modification Example 1 of the present embodiment, the trailing end portion 103b is an end portion on the stepped portion 105 side in the end portion of the mounting portion 301. The mounting portion 301 is mounted with the workpieces W and rotates in accordance with rotation of the rotary portion 303. The workpieces W mounted in the mounting portion 301 move toward the trailing end portion 103b due to vibration of the vibration unit 120. In this example, the mounting portion 301 in its entirety is provided outside the visual angle region A2. A portion or the entirety of the mounting portion 301 may be configured to be provided within the visual angle region A2. In this case, similar to the transportation surface portion 103, groove portions having the same shapes as the groove portions 104 are provided on the mounting surface of the mounting portion 301.

The fall prevention wall portion 302 prevents the workpieces W mounted in the mounting portion 301 from falling from the trailing end portion 103b onto the transportation assistance surface portion 1082 which is the lower surface of the stepped portion 105 due to vibration of the vibration unit 120. In this example, the fall prevention wall portion 302 is a wall surface provided perpendicularly with respect to the mounting portion 301 in front of the trailing end portion 103b in a direction in which the workpieces W mounted on the mounting surface of the mounting portion 301 move due to vibration of the vibration unit 120, on the mounting surface of the mounting portion 301.

The rotary portion 303 rotates the mounting surface of the mounting portion 301 around a rotary axis CA in a radial direction of the pallet 100a in the trailing end portion 103b. The rotary portion 303 causes the workpieces W mounted on the mounting surface to fall onto the transportation assistance surface portion 1082 which is the lower surface of the stepped portion 105, by rotating the mounting surface of the mounting portion 301 as described above. Hereinafter, for the convenience of description, the clockwise direction in a case where the central direction of the pallet 100a is viewed along the rotary axis CA will be referred to as the forward direction, and the counterclockwise direction thereof will be referred to as the opposite direction in the description.

The postures of at least a portion of the workpieces W which have fallen onto the transportation assistance surface portion 1082 due to rotation of the mounting portion 301 caused by the rotary portion 303 are changed. More specifically, in a case where the postures of the workpieces W mounted on the mounting surface of the mounting portion 301 are substantially rear-facing postures which are postures in which the protrusions C1 are grounded with respect to the surface on which the workpieces W are mounted, the postures of at least a portion of the workpieces W are overturned into substantially front-facing postures which are postures in which the protrusions C2 are grounded with respect to the surface on which the workpieces W are mounted, by being caused to fall onto the transportation assistance surface portion 1082 in accordance with rotation of the mounting portion 301 caused by the rotary portion 303. In a case where the postures of the workpieces W mounted on the mounting surface of the mounting portion 301 are the substantially front-facing postures, the postures of at least a portion of the workpieces W are overturned into the substantially rear-facing posture by being caused to fall onto the transportation assistance surface portion 1082 in accordance with rotation of the mounting portion 301 caused by the rotary portion 303.

The substantially front-facing posture is the front surface posture that is a posture in which the protrusion C2 is guided into the groove portion 104 and the front surface Wa is oriented in substantially the upward direction, that is, the desired posture in a case where the workpiece W in the above-referenced posture moves to the transportation surface portion 103 due to vibration of the vibration unit 120. In other words, in the workpiece supplying device 10, when the first posture change unit 300 changes the posture of the workpiece W to the substantially front-facing posture, the posture of the workpiece W can be changed to the front surface posture. Meanwhile, the substantially rear-facing posture is a posture in which the protrusion C1 is guided into the groove portion 104 and the rear surface Wb is oriented in substantially the upward direction in a case where the workpiece W in the above-referenced posture moves to the transportation surface portion 103 due to vibration of the vibration unit 120.

The rotary portion 303 rotates the mounting portion 301 in the forward direction every time the vibration unit 120 stops vibrating. After the mounting portion 301 is rotated in the forward direction, the rotary portion 303 rotates the mounting portion 301 in the opposite direction so that the mounting portion 301 returns to be in the same position and posture (state) before starting to be rotated in the forward direction. Accordingly, in the workpiece supplying device 10, the rotary portion 303 rotates the mounting portion 301 every time the workpieces W stop moving due to vibration of the vibration unit 120, thereby changing the postures of at least a portion among the workpieces W mounted in the mounting portion 301 from the substantially rear-facing postures to the substantially front-facing posture.

In the workpiece supplying device 10, when the rotary portion 303 rotates the mounting portion 301 every time which is referenced above, the pickup unit 220 can pick up the workpiece W and the first posture change unit 300 can change the posture of the workpiece W during the aforementioned pickup period. As a result thereof, in the workpiece supplying device 10, there is no need to temporarily stop vibration of the vibration unit 120 in order to change the posture of the workpiece W by the first posture change unit 300, and thus, it is possible to improve the efficiency of embedment work of the workpiece W with respect to the movement M performed by the picking device 20. In place thereof, the rotary portion 303 may be configured to rotate the mounting portion 301 every time which is different from that described above.

Here, with reference to FIG. 12, description will be given regarding a method changing the posture of the workpiece W performed by the first posture change unit 300.

Figure 12:
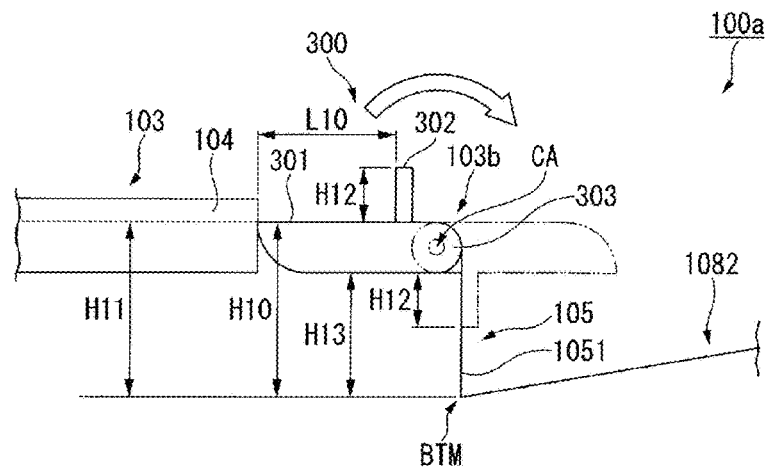
FIG. 12 is a cross-sectional view of an example of a first posture change unit provided in the pallet, taken along a surface orthogonal to a trailing end portion of the pallet.

FIG. 12 is a cross-sectional view of an example of the first posture change unit 300 provided in the pallet 100a, taken along a surface orthogonal to the trailing end portion 103b of the pallet 100a. As illustrated in FIG. 12, the first posture change unit 300 is provided in a portion of the flat surface portion 1031 including the trailing end portion 103b of the pallet 100a.

In this example, the mounting surface of the mounting portion 301 is included inside a surface including the surfaces of the groove portions 104 provided in the transportation surface portion 103. In other words, a height H10 from a lowest portion BTM of the stepped portion 105 to the mounting surface of the mounting portion 301 illustrated in FIG. 12 matches a height H11 from the lowest portion BTM of the stepped portion 105 to the deepest portion of the groove portions 104. Accordingly, in the workpiece supplying device 10, the workpieces W can move from the transportation surface portion 103 to the mounting surface of the mounting portion 301 due to vibration of the vibration unit 120. In place thereof, the height H10 may be configured to be lower than the height H11.

The contour of a cross section (the shape of a cross section) of the mounting portion 301 matches the contour indicated by the two-dot chained line illustrated in FIG. 12 in a case where the rotary portion 303 rotates the mounting portion 301 in a direction of the arrow illustrated in FIG. 12 (that is, the forward direction) centering around the rotary axis CA. In other words, the mounting portion 301 rotates 180 degrees in the forward direction centering around the rotary axis CA.

In this case, when the workpieces W are mounted on the mounting surface of the mounting portion 301, the workpieces W fall from the mounting surface of the mounting portion 301 onto the transportation assistance surface portion 1082. When falling onto the transportation assistance surface portion 1082, the postures of a portion of the workpieces W are changed from the substantially rear-facing postures to the substantially front-facing postures, the postures of a different portion of the workpieces W are changed from the substantially front-facing postures to the substantially rear-facing postures, and the postures of the remaining portion of the workpieces W are not changed while being in the substantially front-facing postures or the substantially rear-facing postures. Since the workpieces W in the front surface postures are picked up by the pickup unit 220 in the visual angle region A2, more workpieces W in the substantially rear-facing postures are generally mounted on the mounting surface of the mounting portion 301 than the workpieces W in the substantially front-facing postures.

In a case where the pickup unit 220 picks up all of the workpieces W in the front surface postures detected in the visual angle region A2, only the workpieces W in the substantially rear-facing postures are mounted on the mounting surface of the mounting portion 301, the postures of a portion or the entirety of the workpieces W in the substantially rear-facing postures are overturned into the substantially front-facing postures. Basically, the picking device 20 picks up all of the workpieces W in the front surface postures detected in the visual angle region A2 except a case where a configuration described below in Modification Example 4 of the embodiment is applied.

Accordingly, in the workpiece supplying device 10, the workpieces W in the substantially rear-facing postures on the mounting surface of the mounting portion 301 among the workpieces W which are not selected as the pickup target by the picking device 20 in the transportation surface portion 103 can be overturned so as to be in the substantially front-facing postures. In a case where the postures of the workpieces W are caused to be the substantially front-facing postures, when moving in the transportation surface portion 103 due to vibration of the vibration unit 120, the protrusions C2 of the workpieces W are respectively guided into the groove portions 104, and thus, the postures of the workpieces W change to the aforementioned desired postures. In other words, in the workpiece supplying device 10, the rate of supplying the workpieces W in the front surface postures which are the desired postures to the picking device 20 can be increased by the first posture change unit 300. In this example, efficiency of assembling the movement M can be improved.

It is desirable that a fall prevention wall height H1 which is a height from the mounting surface of the mounting portion 301 to an end portion on a side opposite to the mounting surface of the fall prevention wall portion 302 is equal to or higher than a height which becomes the highest in a case where the workpieces W are mounted on the mounting surface of the mounting portion 301. This is because there can be cases where the workpieces W cannot be prevented from moving due to vibration of the vibration unit 120 and falling onto the transportation assistance surface portion 1082 in a case where the fall prevention wall height H1 is lower than a height which becomes the highest in a case where the workpieces W are mounted on the mounting surface of the mounting portion 301.

It is desirable that a fall prevention wall height H12 is shorter than a distance H13 between the mounting surface of the mounting portion 301 and the lowest portion BTM of the stepped portion 105 when the rotary portion 303 rotates the mounting portion 301 in the forward direction. This is because the fall prevention wall portion 302 is caught by (is interfered with) the transportation assistance surface portion 1082 so that the mounting portion 301 cannot rotate in the forward direction until the mounting surface of the mounting portion 301 becomes parallel to the flat surface portion 1031 in a case where the rotary portion 303 rotates the mounting portion 301 in the forward direction. The fall prevention wall height H12 may be configured to be longer than the distance H13 between the mounting surface of the mounting portion 301 and the lowest portion BTM of the stepped portion 105 when the rotary portion 303 rotates the mounting portion 301 in the forward direction. However, in this case, the fall prevention wall height H12 has to be a length to the extent in which the workpieces W fall from the mounting surface of the mounting portion 301 onto the transportation assistance surface portion 1082 when the rotary portion 303 rotates the mounting portion 301 in the forward direction.

A mounting surface length L10 which is a length from a surface of the fall prevention wall portion 302 on a side opposite to the stepped portion 105 to the boundary between the mounting surface of the mounting portion 301 and the groove portion 104 (that is, the transportation surface portion 103) is equal to or greater than the length L1 of the workpiece W in the longitudinal direction. This is because in a case where the mounting surface length L10 is less than the length L1 of the workpiece W in the longitudinal direction, there is a possibility that the workpiece W mounted on the mounting surface of the mounting portion 301 falls without rotating together with the mounting surface of the mounting portion 301, when the rotary portion 303 rotates the mounting portion 301.

In this example, the length of the fall prevention wall portion 302 in the direction of the rotary axis CA is the same as the length of the trailing end portion 103b in the direction of the rotary axis CA. In place thereof, the length of the fall prevention wall portion 302 in the direction of the rotary axis CA may be configured to be shorter than the trailing end portion 103b.

In this manner, in the workpiece supplying device 10, when the pallet 100a includes the first posture change unit 300, the posture of the supplying workpiece W can be changed to the desired posture (in this example, the front surface posture).

The pallet 100a may be configured to include a second posture change unit 400 in place of the first posture change unit 300 or together with the first posture change unit 300. Hereinafter, as an example of the configuration in which the pallet 100a includes the second posture change unit 400, description will be given regarding a case where the second posture change unit 400 is included in place of the first posture change unit 300 described in FIGS. 11 and 12.

Figure 13:
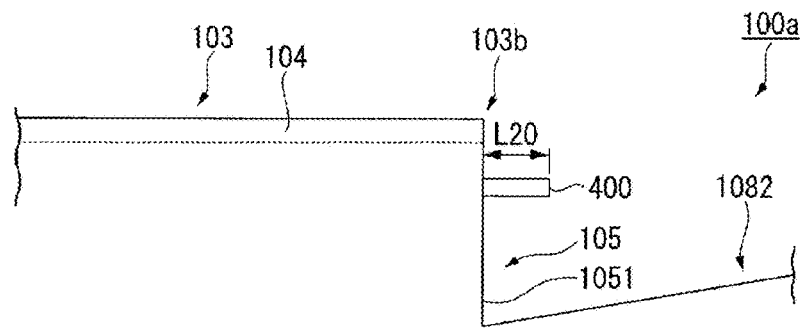
FIG. 13 is a cross-sectional view of an example of a second posture change unit provided in the pallet, taken along a surface orthogonal to the trailing end portion of the pallet.

In the workpiece supplying device 10, the posture of the supplying workpiece W can be changed to the front surface posture (the posture in which the protrusion C2 is guided into the groove portion 104) by the second posture change unit 400. As illustrated in FIG. 13, the pallet 100a includes the second posture change unit 400 at a portion on the stepped surface 1051 of the stepped portion 105.

FIG. 13 is a cross-sectional view of an example of the second posture change unit 400 provided in the pallet 100a, taken along a surface orthogonal to the trailing end portion 103b of the pallet 100a.

The second posture change unit 400 is a protrusion provided on the stepped surface 1051. In this example, the workpieces W move on the transportation surface portion 103 due to vibration of the vibration unit 120 and fall from the trailing end portion 103b onto the transportation assistance surface portion 1082. In this case, a portion of the workpieces W collides with the second posture change unit 400 which is the protrusion provided on the stepped surface 1051, and the postures of a portion of the workpieces W are overturned from the substantially rear-facing postures into the substantially front-facing postures. In this manner, in the workpiece supplying device 10, when the pallet 100*a* includes the second posture change unit 400, the posture of the supplying workpiece W can be changed to the desired posture.

Here, the second posture change unit 400 is a protrusion which protrudes as much from the stepped surface 1051 as a length L20 illustrated in FIG. 13. The length L20 is a length corresponding to the outer shape of the workpiece W. For example, it is desirable that the length L20 is a length to the extent in which the workpieces W cannot be mounted in the second posture change unit 400, in order to prevent the workpieces W from being mounted in the second posture change unit 400. As an example of such a length, in a case where the length of the workpiece W in the longitudinal direction measures 15 millimeters, the length L20 measures approximately 5 millimeters. In this example, the length of the second posture change unit 400 at the trailing end portion 103*b* in the radial direction of the pallet 100*a* is the same as the length of the trailing end portion 103*b* in the radial direction. In place thereof, the length of the second posture change unit 400 at the trailing end portion 103*b* in the radial direction of the pallet 100*a* may be a length shorter than the length of the trailing end portion 103*b* in the radial direction.

The pallet 100*a* may be configured to include a third posture change unit 500 in place of any one or both of the first posture change unit 300 and the second posture change unit 400 or together with the first posture change unit 300 and the second posture change unit 400. Hereinafter, as an example of the configuration in which the pallet 100*a* includes the third posture change unit 500, description will be given regarding a case where the third posture change unit 500 is included in place of both the first posture change unit 300 described in FIGS. 11 and 12, and the second posture change unit 400 described in FIG. 13.

Figure 14:
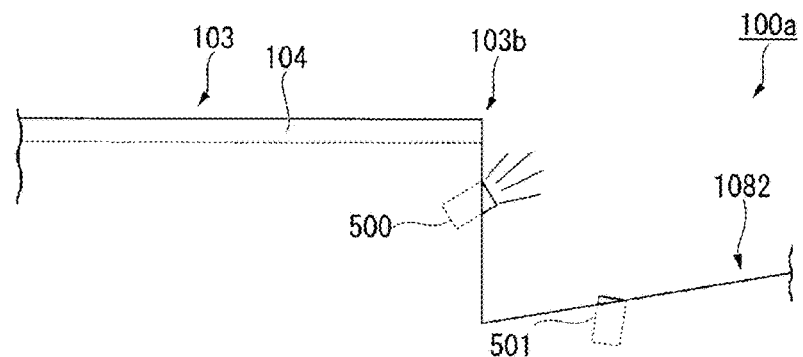
FIG. 14 is a cross-sectional view of an example of a third posture change unit provided in the pallet, taken along a surface orthogonal to the trailing end portion of the pallet.

In the workpiece supplying device 10, the posture of the supplying workpiece W can be changed to the front surface posture (the posture in which the protrusion C2 is guided into the groove portion 104) by the third posture change unit 500. As illustrated in FIG. 14, the pallet 100*a* includes the third posture change unit 500 at a portion on the stepped surface 1051 of the stepped portion 105. As indicated by the dotted line in FIG. 14, in place of the third posture change unit 500 or together with the third posture change unit 500, the pallet 100*a* may be configured to include a third posture change unit 501 at a portion of the transportation assistance surface portion 1082 which is the lower surface of the stepped portion 105. Hereinafter, as an example thereof, description will be given regarding a case where the pallet 100*a* includes only the third posture change unit 500.

FIG. 14 is a cross-sectional view of an example of the third posture change unit 500 provided in the pallet 100*a*, taken along a surface orthogonal to the trailing end portion 103*b* of the pallet 100*a*. The third posture change unit 500 (or the third posture change unit 501) is a nozzle which ejects gas (for example, air and gas). In this example, the workpieces W move on the transportation surface portion 103 due to vibration of the vibration unit 120 and fall from the trailing end portion 103*b* onto the transportation assistance surface portion 1082. In this case, the postures of at least a portion among the workpieces W are overturned from the substantially rear-facing postures into the substantially front-facing postures due to pressure (wind pressure) caused by gas ejected from the third posture change unit 500 provided on the stepped surface 1051.

In this manner, in the workpiece supplying device 10, when the pallet 100*a* includes the third posture change unit 500, the posture of the supplying workpiece W can be changed to the front surface posture. It is desirable that a direction in which gas is ejected from the third posture change unit 500 tilts toward a side opposite to the transportation assistance surface portion 1082 in a direction orthogonal to the stepped surface 1051, as illustrated in FIG. 14. The reason thereof is as follows. In this manner, in the workpiece supplying device 10, the posture of the workpiece W in the substantially rear-facing posture is likely to be overturned so as to be the workpiece W in the substantially front-facing posture.

In a case where the pallet 100*a* includes the third posture change unit 501, it is also desirable that the direction of the third posture change unit 501 ejecting gas tilts toward a side of a transportation direction of the workpiece W in a direction orthogonal to the transportation assistance surface portion 1082, in order to cause the posture of the workpiece W in the substantially rear-facing posture to be likely to be overturned so as to be the workpiece W in the substantially front-facing posture.

The gas ejected from the third posture change unit 500 applies pressure to the workpieces W falling from the trailing end portion 103*b* onto the transportation assistance surface portion 1082 in a direction in which the workpieces W are transported. Therefore, a plurality of the workpieces W can be prevented from overlapping each other on the transportation assistance surface portion 1082.

MODIFICATION EXAMPLE 2 OF EMBODIMENT

Hereinafter, Modification Example 2 of the present embodiment will be described. The workpiece supplying device according to the above-described embodiment may be configured to include the below-described pallet 100*b* in place of the pallet 100 or the pallet 100*a*. The below-described pallet 100*b* may be applied to a configuration different from that of the above-described embodiment.

In the pallet 100*b*, being different from the pallet 100 and the pallet 100*a*, both the transportation surface portion 103 and the transportation assistance surface portion 1082 are subjected to coating. For example, the coating is urethane coating. The coating may be coating adopting a different material. The transportation surface portion 103 and the transportation assistance surface portion 1082 are subjected to such coating and have the uniform friction coefficient. Accordingly, in the workpiece supplying device 10, the workpiece W can be likely to move in both the transportation surface portion 103 and the transportation assistance surface portion 1082 due to vibration of the vibration unit 120.

In the pallet 100*b*, coating may be performed such that the coating applied to the transportation surface portion 103 and the coating applied to the transportation assistance surface portion 1082 adopt materials different from each other. Accordingly, in the pallet 100*b*, the transportation surface portion 103 and the transportation assistance surface portion 1082 can have the friction coefficients different from each other. For example, in the pallet 100*b*, when the friction coefficient of the transportation assistance surface portion 1082 is caused to be higher than the friction coefficient of the transportation surface portion 103, a portion of the workpieces W fallen from the trailing end portion 103*b* onto the transportation assistance surface portion 1082 due to vibration of the vibration unit 120 is likely to be caught by the transportation assistance surface portion 1082. As a result thereof, the posture of the workpiece W can be likely to be overturned from the substantially rear-facing posture into the substantially front-facing posture.

In the pallet 100b, coating may be performed such that the coating applied to a portion of the transportation surface portion 103 and the coating applied to other portions of the transportation surface portion 103 different from the above-referenced portion adopt materials different from each other. For example, in the arc portion included in the pallet 100b in a planar view, the friction coefficient in a first region R1 on an outer side beyond a third radius which is the length obtained by subtracting a half of the difference between the first radius and the second radius from the first radius may be configured to be lower than the friction coefficient in at least a portion of a second region R2 on an inner side within the third radius. This configuration is an example of a case where coating is performed such that the coating applied to the first region R1 and the coating applied to the second region R2 adopt materials different from each other. In place thereof, the third radius may be an arbitrary length which is greater than the second radius and is smaller than the first radius.

In a case where the friction coefficient of the second region R2 is higher than the friction coefficient of the first region R1, the workpieces W in the first region R1 are less likely to move due to vibration of the vibration unit 120, compared to the workpieces W in the second region R2. As a result thereof, in the workpiece supplying device 10, when the workpieces W are transported due to vibration of the vibration unit 120, the workpieces W can be prevented from being scattered from the second region R2 (the inner side in the pallet 100b) to the first region R1 (the outer side in the pallet 100b) and gathering toward the first region R1.

MODIFICATION EXAMPLE 3 OF EMBODIMENT

Hereinafter, with reference to FIG. 15, Modification Example 3 of the present embodiment will be described. The workpiece supplying device 10 according to the above-described embodiment may be configured to include the below-described pallet 100c in place of the pallet 100, the pallet 100a, and a portion or the entirety of the pallet 100b. The below-described pallet 100c may be applied to a configuration different from that of the above-described embodiment. The configuration of the below-described pallet 100c is an example of a configuration which is applied to a case where the friction coefficient on the mounting surface of the pallet 100c is uniform.

In the pallet 100c, being different from the pallet 100, the pallet 100a, and the pallet 100b, at least a portion of the transportation surface portion 103 is provided with a restraint portion 600 which restrains the workpieces W from moving outward to the aforementioned first region R1 beyond the aforementioned third radius.

Figure 15:
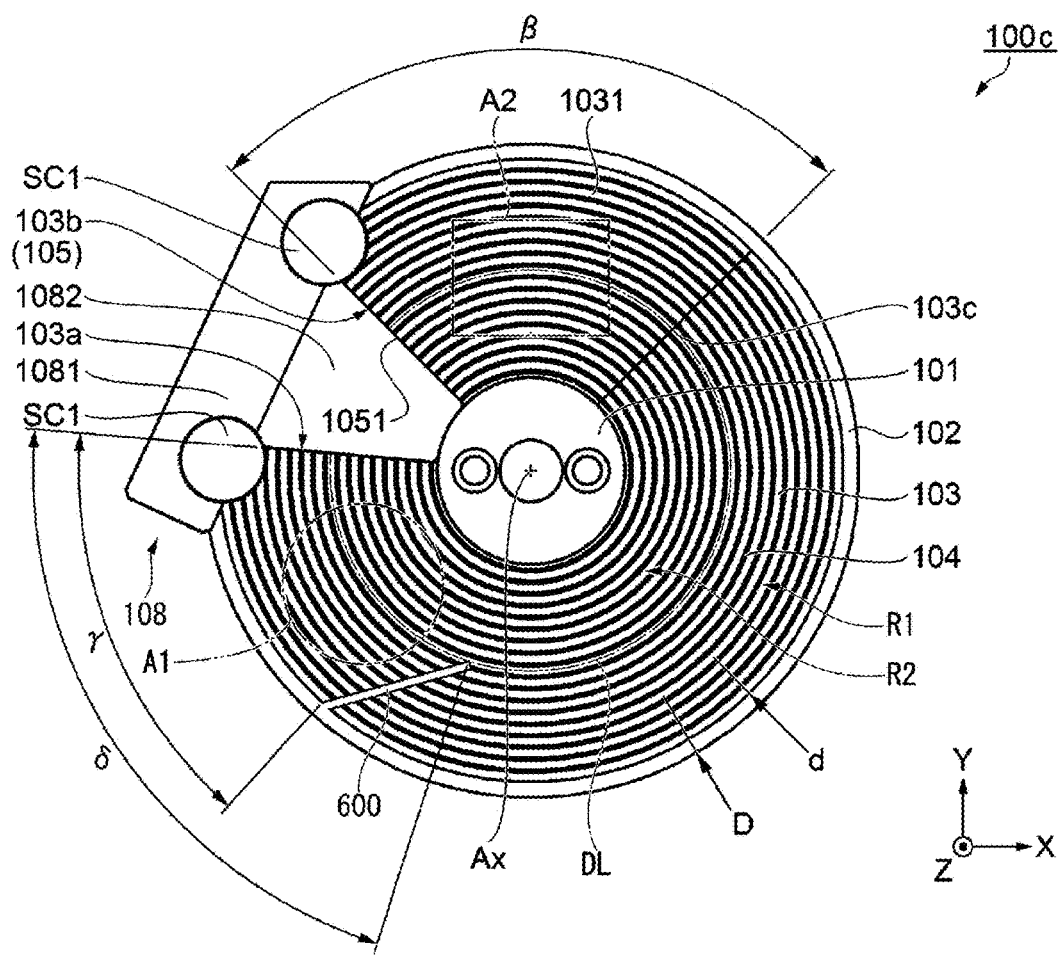
FIG. 15 is a view illustrating an example of the pallet provided with a restraint portion.

FIG. 15 is a view illustrating an example of the pallet 100c provided with the restraint portion 600. As illustrated in FIG. 15, the restraint portion 600 is a wall surface provided in the first region R1. The restraint portion 600 causes the workpieces W which have moved from the second region R2 to the first region R1 side due to vibration of the vibration unit 120 to return from the first region R1 to the second region R2 side by causing the workpieces W to move along the wall surface. In FIG. 15, in order to clarify the boundary between the first region R1 and the second region R2, a circle DL having the third radius is depicted on the pallet 100c by the dotted line.

More specifically, the restraint portion 600 is a wall surface extending from a position on the outer circumference of the edge portion 102, that is, a position on the outer circumference pivotally rotated counterclockwise around the center of the pallet 100c by a predetermined first angle γ from the leading end portion 103a along the transportation surface portion 103 of the pallet 100c to a position on the boundary line between the first region R1 and the second region R2, that is, a position on the boundary line pivotally rotated counterclockwise around the center of the pallet 100c by a predetermined second angle δ from the leading end portion 103a along the transportation surface portion 103 of the pallet 100c.

When the workpieces W which have moved from the second region R2 to the first region R1 side due to vibration of the vibration unit 120 come into contact with the wall surface of the restraint portion 600, the workpieces W move along the wall surface from the first region R1 to the second region R2 side due to vibration of the vibration unit 120. Accordingly, in the workpiece supplying device 10, the workpieces W can be prevented from gathering toward the first region R1 of the pallet 100c.

The workpieces W after being moved to the second region R2 by the restraint portion 600 move again toward the trailing end portion 103b in the transportation surface portion 103 due to vibration of the vibration unit 120. In this case, the workpieces W move again from the second region R2 to the first region R1 side. Therefore, within the visual angle region A2, a predetermined first angle γ and a predetermined second angle δ are set such that the workpieces W are in a state of being scattered in a substantially even manner within a range from the first region R1 to the second region R2.

In a case where the restraint portion 600 is provided in the pallet 100c as described above, the image-capturing unit 201 included in the detection unit 200 of the picking device 20 is installed at a position in the pallet 100c such that the rate of the area of the first region R1 occupying within the visual angle region A2 becomes substantially the same as the rate of the area of the second region R2 occupying within the visual angle region A2. Accordingly, the image-capturing unit 201 can cause the workpieces W being scattered in a substantially even manner within a range from the first region R1 to the second region R2 to be included within the visual angle region A2. As a result thereof, in the picking device 20, the number of the workpieces W which can be selected as the pickup targets detected by the detection unit 200 within the visual angle region A2 can be prevented from being reduced.

In a case where the workpiece supplying device 10 includes a pallet which is not provided with the restraint portion 600 in this example (for example, the pallet 100, the pallet 100a, or the pallet 100b), the workpieces W which move in the transportation surface portion 103 due to vibration of the vibration unit 120 gather toward the first region R1 side in the arc portion of the pallet. Therefore, it is desirable that the image-capturing unit 201 is installed at a position where the area of at least half the visual angle region A2 can be occupied by the area of a portion of the first region R1 on the outer side beyond the third radius in the arc portion of the pallet in the transportation surface portion 103. Accordingly, the image-capturing unit 201 can cause the workpieces W which have gathered in the first region R1 to be included within the visual angle region A2. As a result thereof, in the picking device 20, the number of the workpieces W which can be selected as the pickup targets detected by the detection unit 200 within the visual angle region A2 can be prevented from being reduced.

MODIFICATION EXAMPLE 4 OF EMBODIMENT

Hereinafter, with reference to the drawings, Modification Example 4 of the present embodiment will be described. The picking device 20 according to the above-described embodiment may be configured to include the below-described second control unit in place of the above-described control unit. The below-described second control unit may be applied to a configuration different from that of the above-described embodiment.

The second control unit analyzes an image which is the detection result from the detection unit 200 (image processing). The second control unit selects the workpiece W whose protrusion C2 is guided into the groove portion 104 and whose front surface Wa is oriented in the upward direction, that is, the workpiece W in the front surface posture (the workpiece W as the pickup target). In this case, the second control unit determines whether or not the workpiece W in the desired posture among the workpieces W included in the image satisfies a predetermined condition.

A predetermined condition is a condition related to at least one of the number of the workpieces W in the front surface postures and the position of the workpiece W in the front surface posture. In this example, description will be given regarding a case where a predetermined condition is a condition related to the number of the workpieces W in the front surface postures. In this case, for example, a predetermined condition denotes that the number of the workpieces W in the front surface postures is equal to or greater than a predetermined number.

The second control unit counts the number of the workpieces W in the front surface postures included in the image which is the detection result from the detection unit 200. The second control unit may be configured to calculate a value based on the number of the workpieces W (for example, a statistic value such as a rate of the number of the workpieces W in the front surface postures with respect to the number of all of the workpieces W included in the image). In this case, a predetermined condition denotes that a value based on the number of the workpieces W in the front surface postures is equal to or greater than a predetermined value. The second control unit may be configured to detect other types of information based on the workpiece W, such as the position of each workpiece W. In this case, a predetermined condition denotes that the workpiece in the front surface posture is in a predetermined disposition. For example, a predetermined disposition denotes that an index indicating a dispersion state of the number of the workpieces W in the front surface postures included in the image which is the detection result from the detection unit 200 (for example, entropy) is equal to or greater than a predetermined index value.

In a case where the number of the workpieces W in the front surface postures included in the image which is the detection result from the detection unit 200 does not satisfy a predetermined condition, since there is a possibility that circumstances in which the workpieces W in the front surface postures are picked up by the picking device 20 and no workpiece W in the front surface posture is left within the visual angle region A2 occur, thereby resulting in a delay of the cycle time of the timepiece assembly line 1000, the second control unit does not instruct the pickup unit 220 to pick up the workpiece W. The second control unit instructs the vibration unit 120 so as to vibrate the pallet 100.

Meanwhile, in a case where the number of the workpieces W in the front surface postures included in the image which is the detection result from the detection unit 200 satisfies a predetermined condition, the second control unit determines whether or not the workpiece W in the front surface posture is present in a first detection region W100 which is a region including at least a portion of an end portion of the visual angle region A2 in the transportation direction which is a direction in which the workpiece W is transported within the visual angle region A2 in the visual angle region A2.

In a case where the workpiece W in the front surface posture is present in the first detection region W100, the second control unit instructs the picking device 20 so that the picking device 20 picks up the workpiece W in the front surface posture detected in the first detection region W100. Meanwhile, in a case where no workpiece W in the front surface posture is present in the first detection region W100, the second control unit instructs the picking device 20 so that the picking device 20 picks up the workpiece W in the front surface posture detected in a second detection region W110 which is a region remaining in the visual angle region A2 excluding the first detection region W100.

Accordingly, in the workpiece supplying device 10, it is possible to pick up the workpiece W preferentially from that which seems to be transported to the outside of the visual angle region A2 from the end portion of the visual angle region A2 due to vibration applied to the pallet 100 by the vibration unit 120, among the workpieces W in the front surface postures which become the pickup targets. As a result thereof, it is possible to efficiently supply the workpiece W in the front surface posture that becomes the pickup target mounted in the pallet 100.

Hereinafter, with reference to FIG. 16, processing of the second control unit will be described.

Figure 16:
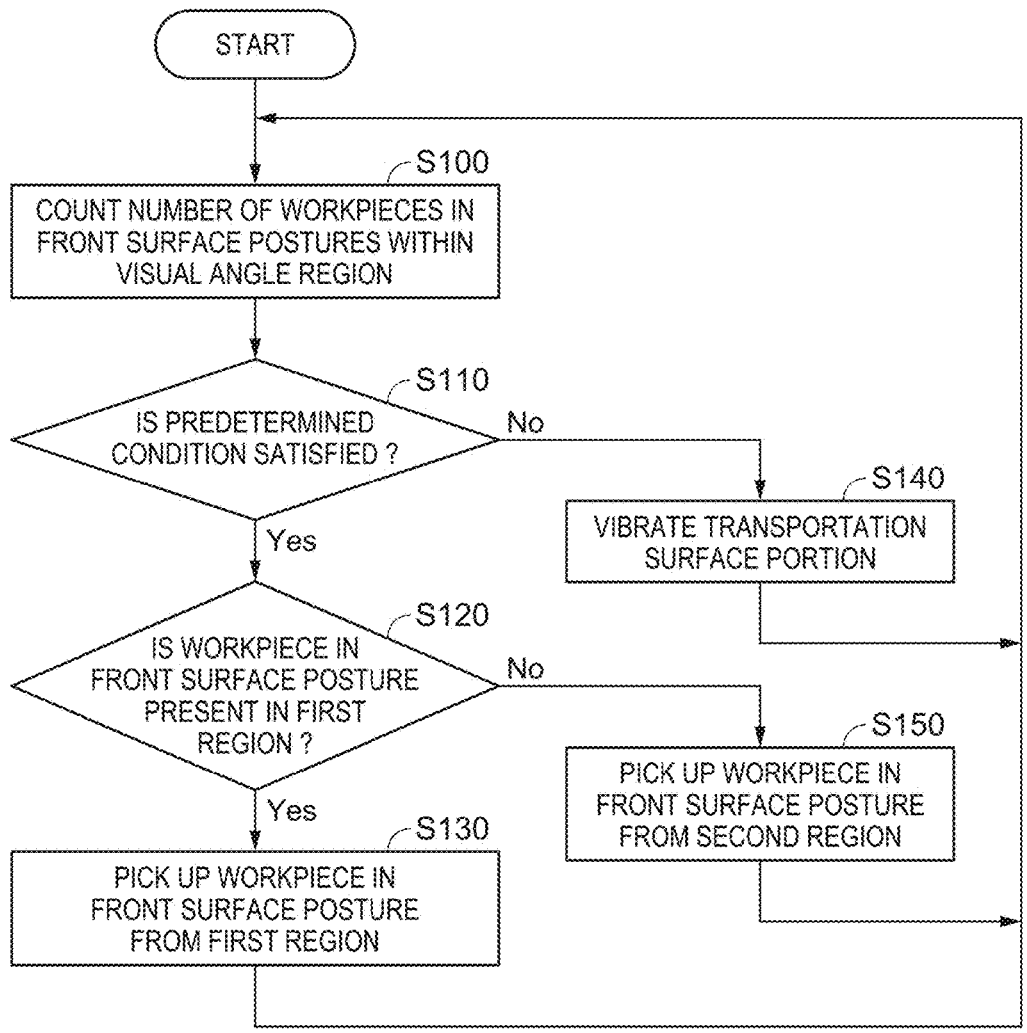
FIG. 16 is a flow chart illustrating an example of a flow in processing of a second control unit.

FIG. 16 is a flow chart illustrating an example of a flow in the processing of the second control unit.

The second control unit instructs the image-capturing unit 201 to capture an image of the visual angle region A2. Then, the second control unit instructs the detection unit 200 to detect the position and the posture of the workpiece W from the image captured by the image-capturing unit 201. The second control unit instructs the detection unit 200 to count the number of the workpieces W in the front surface postures in the image (Step S100). Subsequently, the second control unit determines whether or not the number counted in Step S100 satisfies a predetermined condition (in this example, whether or not the number thereof is equal to or greater than a predetermined number) (Step S110).

In a case where the number counted in Step S100 is determined not to satisfy a predetermined condition (No in Step S110), the second control unit instructs the vibration unit 120 to vibrate the pallet 100 for a predetermined vibration time (Step S140). After the lapse of a predetermined vibration time, the second control unit instructs the vibration unit 120 to stop vibration applied to the pallet 100. After standing by for a predetermined standby time from when vibration has stopped, the second control unit shifts to Step S100 and causes the image-capturing unit 201 to capture an image of the visual angle region A2 again. For example, a predetermined vibration time is approximately 0.5 seconds. In place thereof, a predetermined vibration time may be a different time.

A predetermined standby time is a time to cope with assembling accuracy when assembling the movement M with the workpiece W. For example, a predetermined standby time is approximately 0.3 seconds. In place thereof, a predetermined standby time may be a time other than 0.3 seconds. In this manner, after standing by for a predetermined standby time from when vibration of the vibration unit 120 has stopped, in order to perform processing of Step S100, the second control unit can cause the image-capturing unit 201 to capture an image of the visual angle region A2 after the posture of the workpiece W which is unstable due to vibration (for example, in a sliding state due to vibration) becomes stable (for example, in a non-sliding state). As a result thereof, the second control unit can cause the detection unit 200 to detect the position and the posture of the workpiece W with accuracy.

Meanwhile, in a case where the number counted in Step S100 is determined to satisfy a predetermined condition (Yes in Step S110), the second control unit determines whether or not the workpiece W in the front surface posture is detected by the detection unit 200 in the first detection region W100 (Step S120).

Here, with reference to FIG. 17, description will be given regarding the first detection region W100 and the second detection region W110 set in the visual angle region A2.

Figure 17:
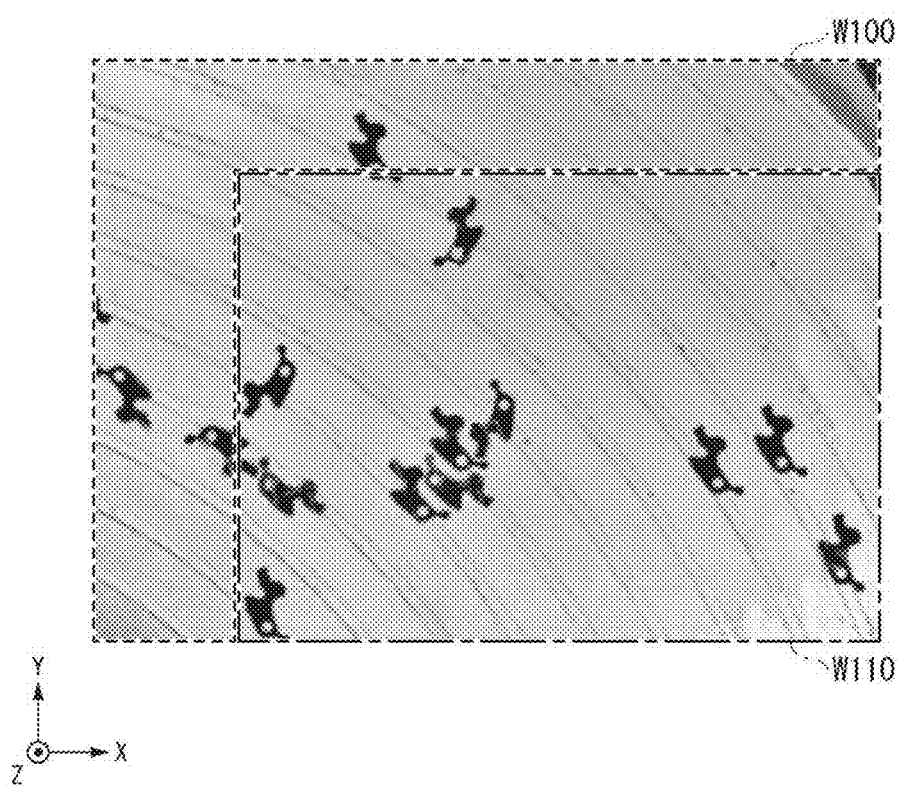
FIG. 17 is a view illustrating an example of an image of the visual angle region which is captured by the detection unit (image-capturing unit) and in which a first detection region and a second detection region are set.

FIG. 17 is a view illustrating an example of an image of the visual angle region A2 in which the first detection region W100 and the second detection region W110 are set, captured by the detection unit 200 (the image-capturing unit 201). The image illustrated in FIG. 17 is an image captured at a time different from the time when the image illustrated in FIG. 10 is captured. In FIG. 17, the dotted line indicating the first detection region W100 and the one-dot chain line indicating the second detection region W110 are depicted so as not to overlap each other in order to clarify the boundaries therebetween. However, the lines actually overlap each other within the visual angle region A2. As illustrated in FIG. 17, the second control unit sets two regions, that is, the first detection region W100 and the second detection region W110 with respect to the visual angle region A2. The second control unit may be configured to set regions equal to or more than three with respect to the visual angle region A2.

The first detection region W100 set in the visual angle region A2 includes at least a portion of the end portion in the transportation direction of the workpiece W. In this example, the first detection region W100 includes both an end portion of the visual angle region A2 on the negative X-direction side, that is, an end portion in the transportation direction of the workpiece W and an end portion thereof on the positive Y-direction side. As illustrated in FIG. 17, the first detection region W100 is an L-shaped region including the two end portions. In this example, the second detection region W110 set in the visual angle region A2 is a region remaining after the first detection region W100 is excluded in the visual angle region A2.

Here, in FIG. 17, the transportation direction of the workpiece W is the third quadrant direction (the obliquely upward direction in FIG. 17) on the XY-plane surface in the XYZ-orthogonal coordinate system illustrated in FIG. 17. Therefore, the first detection region W100 includes both the end portion of the visual angle region A2 on the negative X-direction side, that is, the end portion in the transportation direction of the workpiece and the end portion thereof on the positive Y-direction side. In other words, with the lapse of time, the workpiece W moves to the outside of the visual angle region A2 from the visual angle region A2 through any one or both of the end portion on the negative X-direction side, that is, the end portion in the transportation direction of the workpiece and the end portion on the positive Y-direction side.

In Step S120, in a case where the workpiece W in the front surface posture is determined to be detected in the first detection region W100 illustrated in FIG. 17 by the detection unit 200 when detection of the workpiece W in the front surface posture is performed in Step S100 (Yes in Step S120), the second control unit selects one or more workpieces W in the front surface postures detected in the first detection region W100, as the workpieces W which become the pickup targets, in the detection order, a random order, or other orders, for example. The second control unit instructs the pickup unit 220 to pick up the selected workpiece W which becomes the pickup target (Step S150). The second control unit instructs the pickup unit 220 to assemble the movement M with the picked-up workpiece W. After the pickup unit 220 picks up the workpiece W, the second control unit instructs the vibration unit 120 to apply vibration to the pallet 100, thereby transporting the workpiece W to the workpiece supplying device 10. After vibration being applied to the pallet 100 stops, the second control unit stands by for a predetermined standby time and shifts to Step S100. The second control unit causes the image-capturing unit 201 to capture an image of the visual angle region A2 again.

Meanwhile, in a case where the workpiece W in the front surface posture is determined not to be detected in the first detection region W100 illustrated in FIG. 17 by the detection unit 200 when detection of the workpiece W in the front surface posture is performed in Step S100 (No in Step S120), the second control unit selects one or more workpieces W in the front surface postures detected in the second detection region W110, as the workpieces W which become the pickup targets, in the detection order, a random order, or other orders, for example. The second control unit instructs the pickup unit 220 to pick up the selected workpiece W which becomes the pickup target (Step S130). The second control unit instructs the pickup unit 220 to assemble the movement M with the picked-up workpiece W. During the pickup period, the second control unit instructs the vibration unit 120 to apply vibration to the pallet 100, thereby transporting the workpiece W to the workpiece supplying device 10. After vibration being applied to the pallet 100 stops, the second control unit stands by for a predetermined standby time and shifts to Step S100. The second control unit causes the image-capturing unit 201 to capture an image of the visual angle region A2 again.

In this manner, through the processing after Step S120, the second control unit can cause the pickup unit 220 to pick up the workpiece W preferentially from that which seems to be transported to the outside of the visual angle region A2 from the end portion of the visual angle region A2 due to vibration applied to the pallet 100 by the vibration unit 120, among the workpieces W which become the picking targets. As a result thereof, the workpiece supplying device 10 can efficiently supply the workpiece W that becomes the picking target mounted in the pallet 100.

As described above, the workpiece supplying device of the present embodiment changes the posture of the workpiece W. Accordingly, the workpiece supplying device 10 can change the posture of the supplying workpiece W to the front surface posture.

The workpiece supplying device 10 changes the posture of the workpiece W by using the first posture change unit 300 provided on the upper surface of the stepped portion 105. Accordingly, the workpiece supplying device 10 can change the posture of the workpiece W to the front surface posture by using the first posture change unit 300 provided on the upper surface of the stepped portion 105.

In the workpiece supplying device 10, the workpiece W can be mounted and moved in the mounting portion 301. Accordingly, the workpiece supplying device 10 can change the posture of the workpiece W to the front surface posture by moving the workpiece W mounted in the mounting portion 301.

The workpiece supplying device 10 rotates the mounting portion 301. Accordingly, the workpiece supplying device 10 can change the posture of the workpiece W mounted in the mounting portion 301 to the front surface posture by rotating the mounting portion 301.

The workpiece supplying device 10 changes the posture of the workpiece W by using the second posture change unit 400 provided on the stepped surface 1051 of the stepped portion 105 which is included in the pallet 100a. Accordingly, the workpiece supplying device 10 can change the posture of the workpiece W to the desired posture by using the second posture change unit 400 provided on the stepped surface 1051 of the stepped portion 105 which is included in the pallet 100a.

The workpiece supplying device 10 changes the posture of the workpiece W by using the protrusion (in this example, the second posture change unit 400) provided on the stepped surface 1051. Accordingly, the workpiece supplying device 10 can change the posture of the workpiece W to the front surface posture by using the protrusion provided on the stepped surface 1051.

The workpiece supplying device 10 changes the posture of the workpiece W by using any one or both of the third posture change unit 500 provided on the lower surface of the stepped portion 105 which is included in the pallet 100a, and the third posture change unit 501 provided on the stepped surface 1051 of the stepped portion 105. Accordingly, the workpiece supplying device 10 can change the posture of the workpiece W to the front surface posture by using any one or both of the third posture change unit 500 provided on the lower surface of the stepped portion 105 which is included in the pallet 100a, and the third posture change unit 501 provided on the stepped surface 1051 of the stepped portion 105.

The workpiece supplying device 10 ejects gas from any one or both of the third posture change unit 500 provided on the lower surface of the stepped portion 105 which is included in the pallet 100a, and the third posture change unit 501 provided on the stepped surface 1051 of the stepped portion 105. Accordingly, the workpiece supplying device 10 can change the posture of the workpiece W to the front surface posture by ejecting gas from any one or both of the third posture change unit 500 and the third posture change unit 501.

The workpiece supplying device 10 overturns the workpiece W. Accordingly, the workpiece supplying device 10 can change the posture of the workpiece W to the front surface posture by overturning the workpiece W.

The workpiece supplying device 10 applies vibration to the pallet (for example, the pallet 100, the pallet 100a, the pallet 100b, and the pallet 100c) including the arc portion in a planar view, by using the vibration unit 120. Accordingly, the workpiece supplying device 10 can supply the workpiece W along the arc portion of the pallet due to vibration of the vibration unit 120. As a result thereof, the workpiece supplying device 10 can cause the workpiece W that has not been picked up to circle around along the arc portion.

In the workpiece supplying device 10, the friction coefficient in the first region R1 on the outer side beyond the third radius on the mounting surface of the pallet (for example, the pallet 100, the pallet 100a, the pallet 100b, and the pallet 100c) to which the workpiece W is transported is lower than the friction coefficient in at least a portion of the second region R2 on the inner side within the third radius. Accordingly, in the workpiece supplying device 10, the workpieces W which are transported due to vibration can be prevented from gathering toward the outer circumference side of the pallet on the mounting surface of the pallet.

In the workpiece supplying device 10, the mounting surface of the pallet (for example, the pallet 100, the pallet 100a, the pallet 100b, and the pallet 100c) to which the workpiece W is transported has the uniform friction coefficient. Accordingly, in the workpiece supplying device 10, processing of the mounting surface of the pallet can be easily performed.

The workpiece supplying device 10 applies vibration to the pallet 100c in a case where the workpiece W that becomes the picking target mounted in the pallet 100c in the visual angle region A2 in which the image-capturing unit 201 performs image-capturing does not satisfy a predetermined condition. Accordingly, the workpiece supplying device 10 can efficiently supply the workpiece W that becomes the picking target mounted in the pallet 100c.

The workpiece supplying device 10 applies vibration to the pallet 100c in a case where the workpiece W that becomes the picking target mounted in the pallet 100c in the visual angle region A2 in which the image-capturing unit 201 performs image-capturing satisfies the condition related to at least one of the number of the workpieces W and the position of the workpiece W. Accordingly, the workpiece supplying device 10 can efficiently supply the workpiece W that becomes the picking target mounted in the pallet 100c based on the condition related to at least one of the number of the workpieces W and the position of the workpiece W.

In the workpiece supplying device 10, the picking device 20 picks the workpiece W from that positioned in the first detection region W100 which is a region set within the visual angle region A2 in which the image-capturing unit 201 performs image-capturing. Accordingly, in the workpiece supplying device 10, it is possible to pick up the workpiece W preferentially from that transported prior to other workpieces W among the workpieces W which become the picking targets. As a result thereof, it is possible to efficiently supply the workpiece W that becomes the picking target mounted in the pallet 100c.

In the workpiece supplying device 10, the picking device 20 picks the workpiece W from that positioned in the region set in the visual angle region A2 in which the image-capturing unit 201 performs image-capturing, that is, the region including at least a portion of the end portion of the visual angle region A2 in the transportation direction of the workpiece W. Accordingly, in the workpiece supplying device 10, it is possible to pick up the workpiece W preferentially from that which seems to be transported to the outside of the visual angle region A2 from the end portion of the visual angle region A2 due to vibration applied to the pallet 100c by the vibration unit 120, among the workpieces W which become the picking targets. As a result thereof, it is possible to efficiently supply the workpiece W that becomes the picking target mounted in the pallet 100c.

The workpiece supplying device 10 supplies the workpiece W by applying vibration to the pallet 100c having the arc portion in a planar view. Accordingly, the workpiece supplying device 10 can resupply the workpiece W that has not been picked up, as the workpiece W which becomes the picking target.

The workpiece supplying device 10 restrains the workpiece W from moving toward the outer side beyond the third radius. Accordingly, in the workpiece supplying device 10, the workpieces W can be prevented from gathering toward the first region R1 of the pallet 100c.

In the workpiece supplying device 10, at least half the visual angle region A2 of the image-capturing unit 201 is occupied by a portion of the first region R1 on the outer side beyond the third radius of the arc portion of the pallet 100c on the mounting surface of the pallet 100c. Accordingly, for example, in a case where the workpieces W gather toward the first region R1 of the pallet 100c, the workpiece supplying device 10 can efficiently supply the workpiece W that becomes the picking target mounted in the pallet 100c.

In the workpiece supplying device 10, the image-capturing unit 201 captures an image of the workpiece W with the lapse of a predetermined standby time after vibration caused by the vibration unit 120 stops. Accordingly, the workpiece supplying device 10 can stand by until the change of the posture of the workpiece W due to vibration caused by the vibration unit 120 is settled. As a result thereof, the image-capturing unit 201 can capture an image of the workpiece W in a state where the posture of the workpiece W is stable.

What is claimed is:

1. A workpiece supplying device comprising:
   a pallet having a stepped portion and accommodating a workpiece, wherein the pallet is light-transmissive;
   an image capturing device that detects a position and a posture of the workpiece on the pallet; and
   a vibration unit that applies vibration to the pallet to transport the workpiece in a circumferential direction along a front surface of the pallet.

2. The workpiece supplying device according to claim 1, wherein
   the image capturing device is configured to capture an image of the workpiece on the pallet,
   the vibration unit is configured to operate in an on-state where vibration is applied to the pallet and an off-state where vibration is not applied to the pallet, and
   the vibration unit is in the off-state during a period of time when the image capturing device captures the image of the workpiece.

3. The workpiece supplying device according to claim 2, wherein the pallet includes an arc portion in a planar view, the arc portion having a substantial ring-shape which includes a cut-off portion and is obtained by excluding a circle having a second radius that is a radius shorter than a first radius from a circle having the first radius, and
   wherein on a mounting surface of the pallet, a restraint wall at a first region on an outer side beyond a third radius which is a length obtained by subtracting a half of a difference between the first radius and the second radius from the first radius causes the workpiece to move from a second region on an inner side within the third radius to the first region.

4. The workpiece supplying device according to claim 3, wherein the image capturing device is configured to capture the image in an image capturing region on the pallet, and
   at least a half of the image capturing region is occupied by the first region.

5. The workpiece supplying device according to claim 4, further comprising:
   a controller that counts a number of workpieces in a front-surface posture included in the image capturing region.

6. The workpiece supplying device according to claim 5, wherein the controller is configured to operate the vibration unit in an on-state to vibrate the pallet when the number of workpieces is less than a predetermined threshold.

7. The workpiece supplying device according to claim 5, further comprising:
   a pickup unit configured to pick up workpieces,
   wherein, when the counted number of workpieces is greater than or equal to a predetermined threshold, the controller is configured to detect at least one workpiece in a first detection region positioned within the image capturing region and instruct the pickup unit to pick up the at least one workpiece.

8. The workpiece supplying device according to claim 7, wherein the controller is configured to instruct the pickup unit to pick up at least one workpiece in a second detection region which is a region remaining in the image capturing region excluding the first detection region.

9. A robot which picks the workpiece from the workpiece supplying device according to claim 1.

10. A robot which picks the workpiece from the workpiece supplying device according to claim 2.

11. A robot which picks the workpiece from the workpiece supplying device according to claim 3.

12. A robot which picks the workpiece from the workpiece supplying device according to claim 4.

13. A robot which picks the workpiece from the workpiece supplying device according to claim 5.

14. A robot which picks the workpiece from the workpiece supplying device according to claim 6.

15. A robot system comprising:
    the workpiece supplying device according to claim 1; and
    a robot which picks the workpiece from the workpiece supplying device.

16. A robot system comprising:
    the workpiece supplying device according to claim 2; and
    a robot which picks the workpiece from the workpiece supplying device.

17. A robot system comprising:
    the workpiece supplying device according to claim 3; and
    a robot which picks the workpiece from the workpiece supplying device.

18. A robot system comprising:
    the workpiece supplying device according to claim 4; and
    a robot which picks the workpiece from the workpiece supplying device.

19. A robot system comprising:
    the workpiece supplying device according to claim 5; and
    a robot which picks the workpiece from the workpiece supplying device.

20. A robot system comprising:
    the workpiece supplying device according to claim 6; and
    a robot which picks the workpiece from the workpiece supplying device.

* * * * *